US006537604B1

(12) United States Patent
Ethington, Jr.

(10) Patent No.: US 6,537,604 B1
(45) Date of Patent: Mar. 25, 2003

(54) LIQUID BYPRODUCT FROM AGRICULTURAL PROCESSING AND FIBROUS PORTION FROM MILLING FEED

(75) Inventor: Reed T. Ethington, Jr., Marshall, MN (US)

(73) Assignee: Minnesota Corn Processors, LLC, Marshall, MN (US)

( * ) Notice: Subject to any disclaimer, the term of this patent is extended or adjusted under 35 U.S.C. 154(b) by 0 days.

(21) Appl. No.: 09/999,258

(22) Filed: Oct. 31, 2001

Related U.S. Application Data

(60) Provisional application No. 60/244,743, filed on Oct. 31, 2000.

(51) Int. Cl.$^7$ .................................................. A23L 1/20
(52) U.S. Cl. ..................................................... 426/634
(58) Field of Search ................................ 426/635, 639, 426/658, 807, 634

(56) References Cited

U.S. PATENT DOCUMENTS

| | | |
|---|---|---|
| RE24,261 E | 12/1956 | Martin |
| 3,246,336 A | 4/1966 | Baribo et al. |
| 3,615,649 A | 10/1971 | Parish et al. |
| 3,932,736 A * | 1/1976 | Zarow et al. ............ 235/151.1 |
| 3,961,081 A | 6/1976 | McKenzie |
| 4,012,535 A * | 3/1977 | Fiala et al. ................. 426/658 |
| 4,027,043 A | 5/1977 | Schroeder et al. |
| 4,055,667 A | 10/1977 | Linton et al. ................. 426/623 |
| 4,160,041 A | 7/1979 | Schroeder et al. |
| 4,171,385 A | 10/1979 | Skoch et al. ................. 425/331 |
| 4,171,386 A | 10/1979 | Skoch et al. ................. 425/331 |
| 4,234,608 A * | 11/1980 | Linehan ...................... 426/72 |
| 4,265,916 A | 5/1981 | Skoch et al. ................. 425/331 |
| 4,287,220 A * | 9/1981 | Pappas et al. .............. 426/623 |
| 4,349,578 A * | 9/1982 | Wright et al. ................ 426/630 |
| 4,380,424 A * | 4/1983 | Skoch et al. ................. 425/331 |
| 4,431,675 A | 2/1984 | Schroeder et al. |
| 4,486,451 A | 12/1984 | Linton et al. ................. 426/623 |
| 4,698,225 A * | 10/1987 | Morrison ...................... 426/96 |
| 4,708,877 A | 11/1987 | Donovan et al. ............. 426/69 |
| 4,735,809 A | 4/1988 | Donovan et al. ............. 426/69 |
| 4,800,088 A * | 1/1989 | Sawhill ....................... 426/69 |
| 4,859,485 A * | 8/1989 | Linton et al. ................. 426/623 |
| 4,904,486 A * | 2/1990 | Donovan et al. ............. 426/69 |
| 4,992,281 A | 2/1991 | Linton et al. ................. 426/623 |
| 5,709,894 A | 1/1998 | Julien ......................... 426/53 |
| 5,863,574 A | 1/1999 | Julien ......................... 426/53 |
| 6,123,967 A | 9/2000 | Troska et al. |
| 6,168,803 B1 * | 1/2001 | Harris et al. ................. 424/442 |
| 6,221,424 B1 * | 4/2001 | Kalmbach ................... 426/807 |

* cited by examiner

*Primary Examiner*—Chhaya D. Sayala
(74) *Attorney, Agent, or Firm*—Sterne, Kessler, Goldstein & Fox P.L.L.C.

(57) ABSTRACT

An animal feed comprising a mixture of a liquid byproduct from agricultural processing and a fibrous portion from milling.

36 Claims, 16 Drawing Sheets

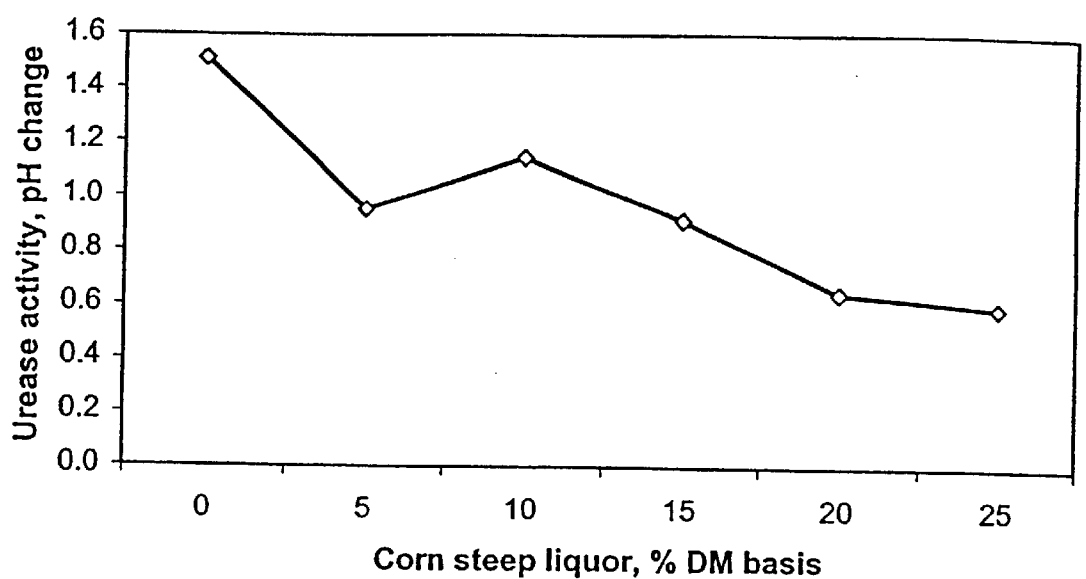
Figure 1. Effect of corn steep liquor on urease activity (AACC, 1983) of raw soybean hulls.

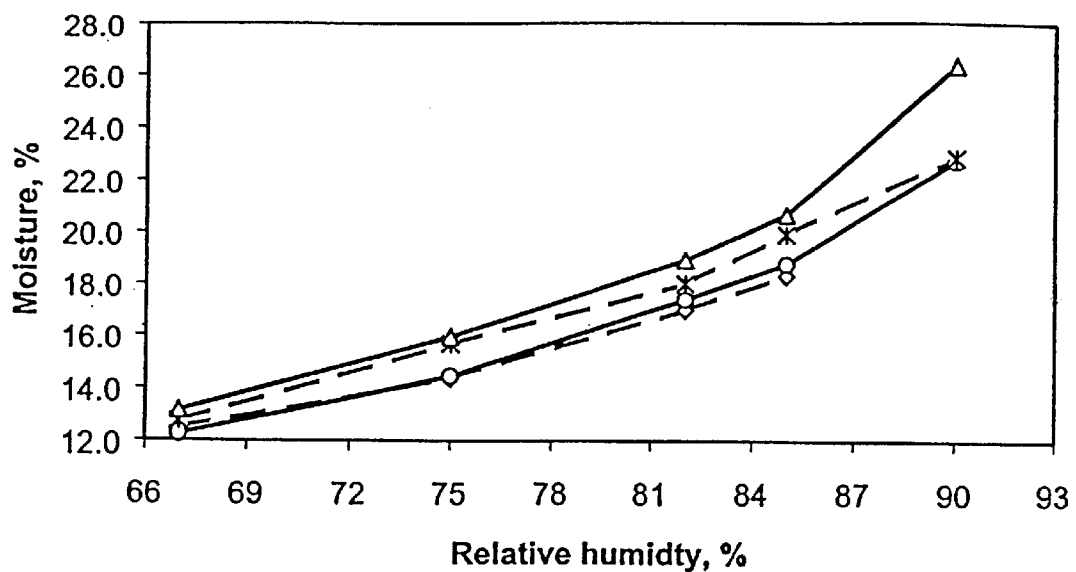
Figure 2. Equilibrated moisture content of pellets containing raw soybean hulls and 10 (◇),15 (○), 20 (✶), and 25% (△) CSL (DM basis) at 10°C. Standard errors were 0.20, 0.15, 0.32, and 0.11, respectively.

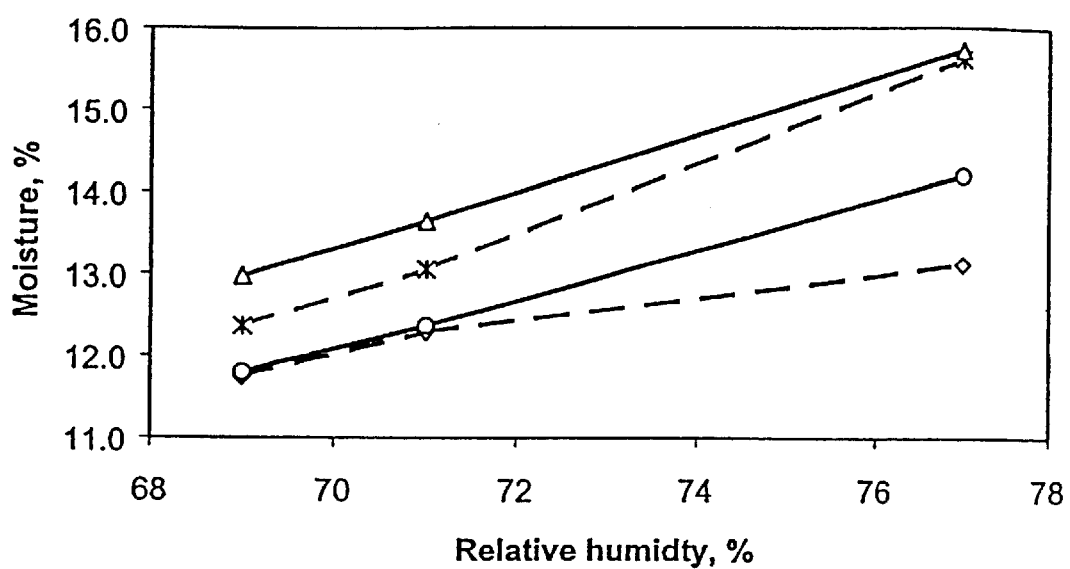
Figure 3. Equilibrated moisture content of pellets containing raw soybean hulls and 10 (◇),15 (○), 20 (✽), and 25% (△) CSL (DM basis) at 30°C. Standard errors were 0.21, 0.02, 0.25, and 0.01, respectively.

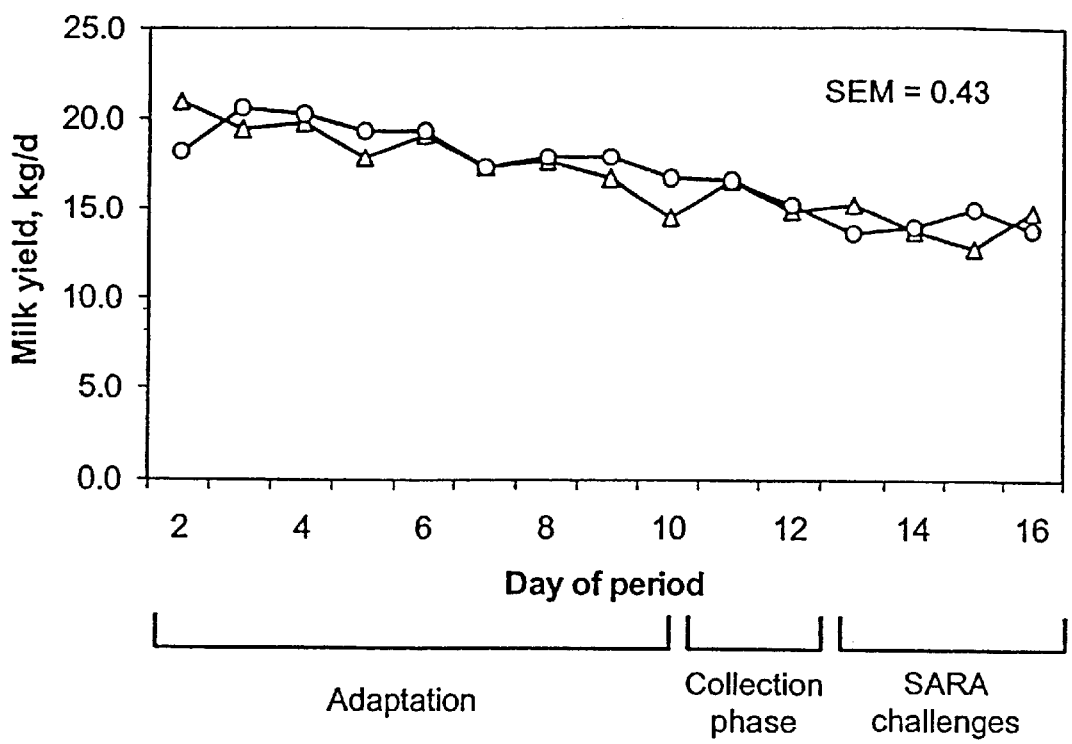
Figure 4. Effect of induced SARA challenge on daily milk yields of cows fed SHSL (○) or control (Δ).

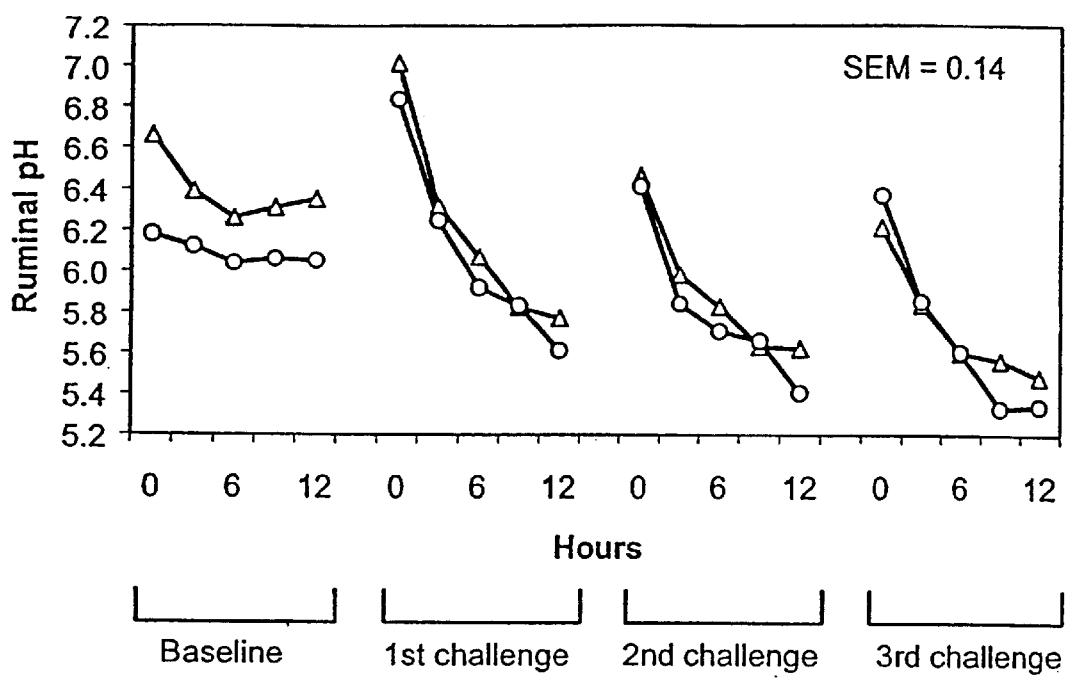
Figure 5. Effect of induced SARA challenge on ruminal pH of cows fed SHSL (O) or control (Δ).

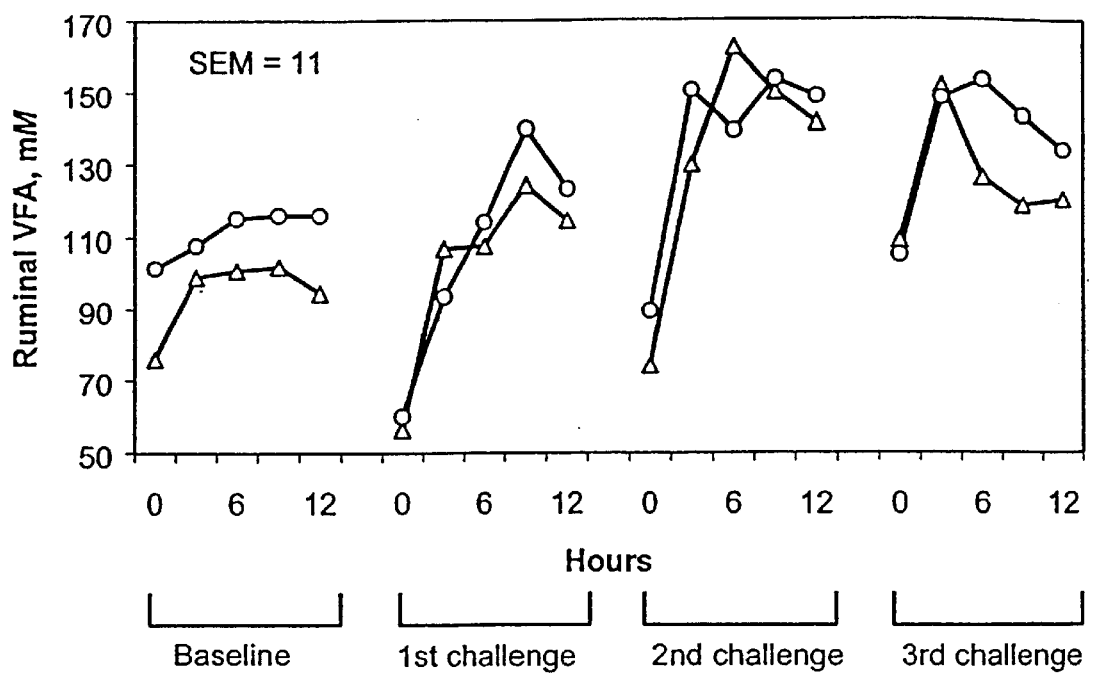
Figure 6. Effect of induced SARA challenge on total ruminal volatile fatty acid concentrations of cows fed SHSL (○) or control (△).

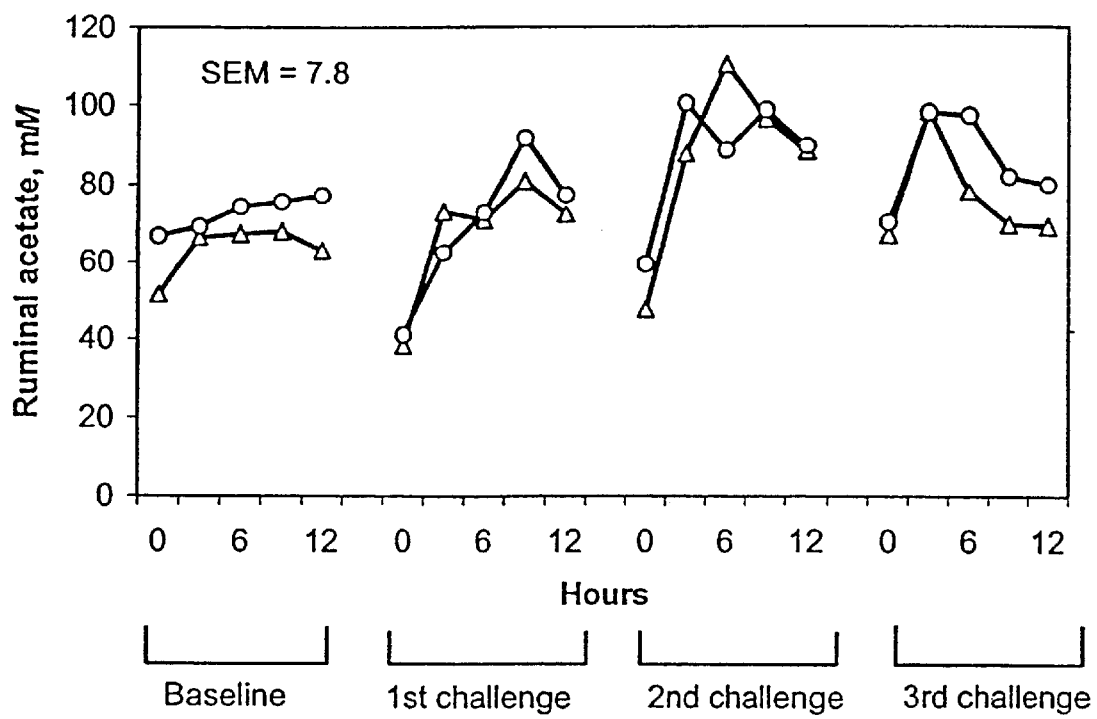
Figure 7. Effect of induced SARA challenge on ruminal acetate concentrations of cows fed SHSL (o) or control (Δ).

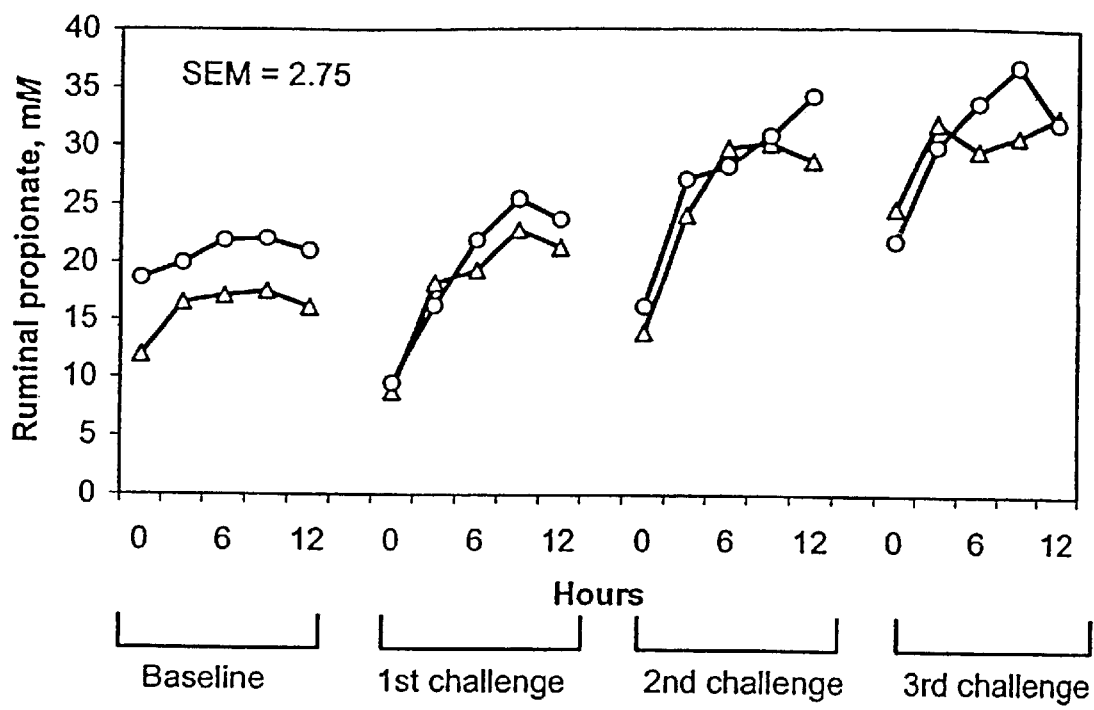
Figure 8. Effect of induced SARA challenge on ruminal propionate concentrations of cows fed SHSL (O) or control (Δ).

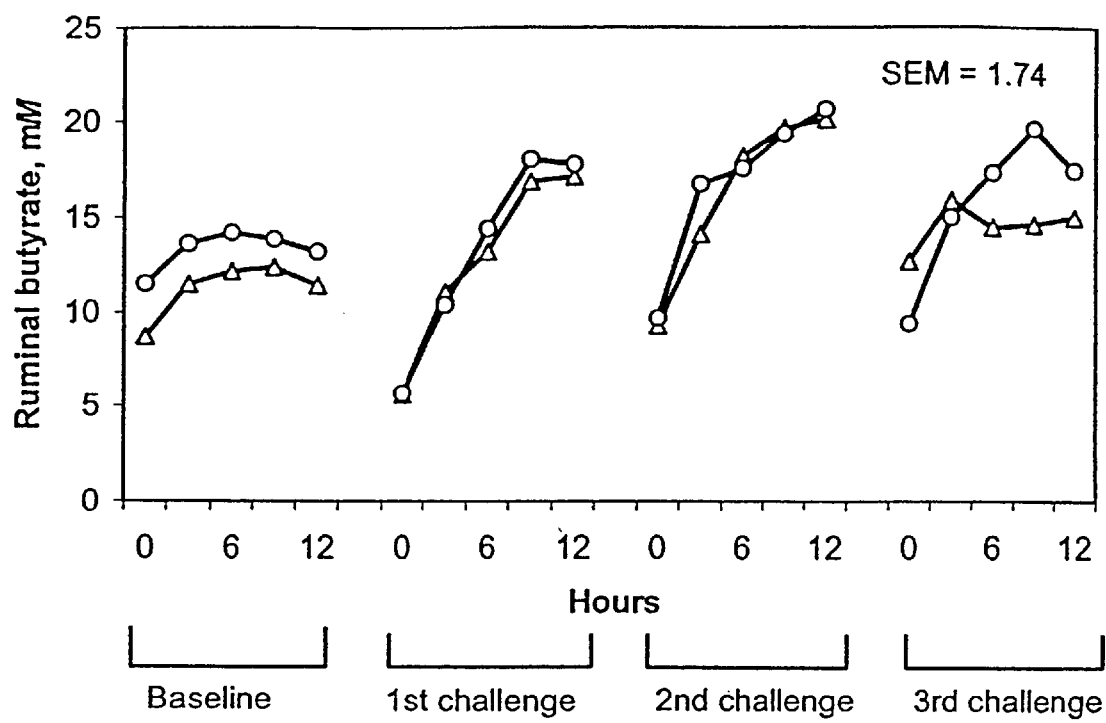
Figure 9. Effect of induced SARA challenge on ruminal butyrate concentrations of cows fed SHSL (O) or control (Δ).

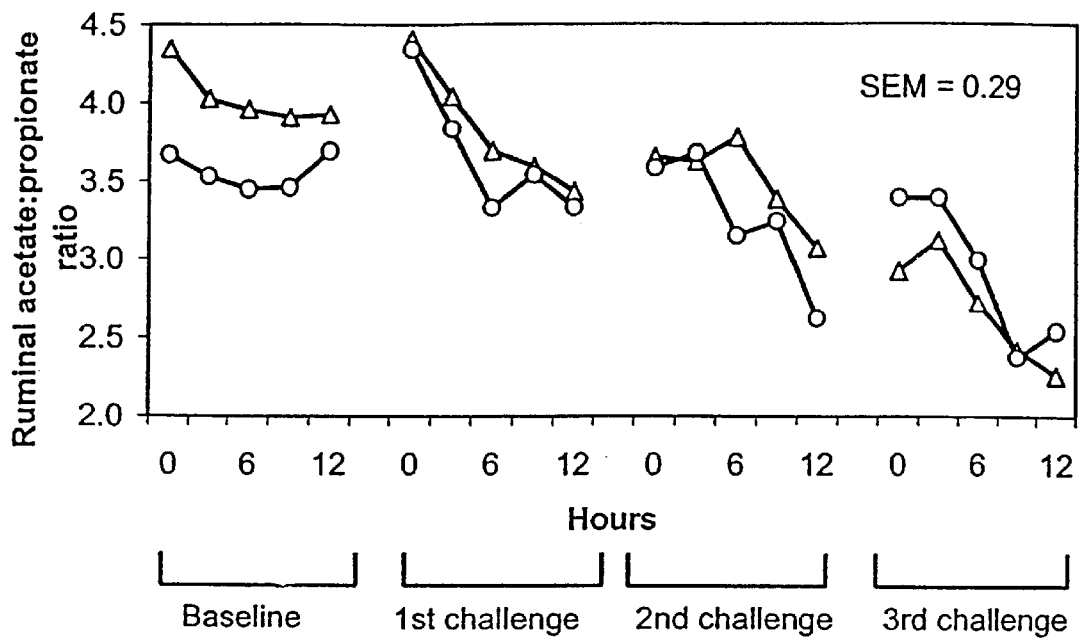
Figure 10. Effect of induced SARA challenge on ruminal acetate:propionate ratio of cows fed SHSL (○) or control (△).

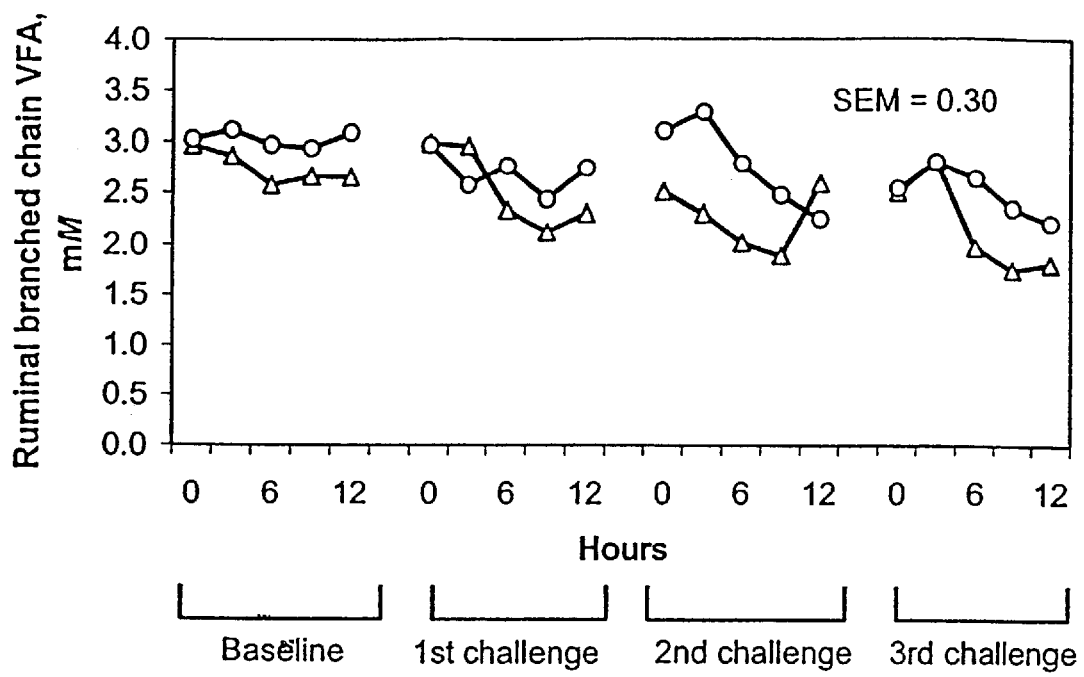
Figure 11. Effect of induced SARA challenge on ruminal branched chain volatile fatty acid concentrations of cows fed SHSL (O) or control (Δ).

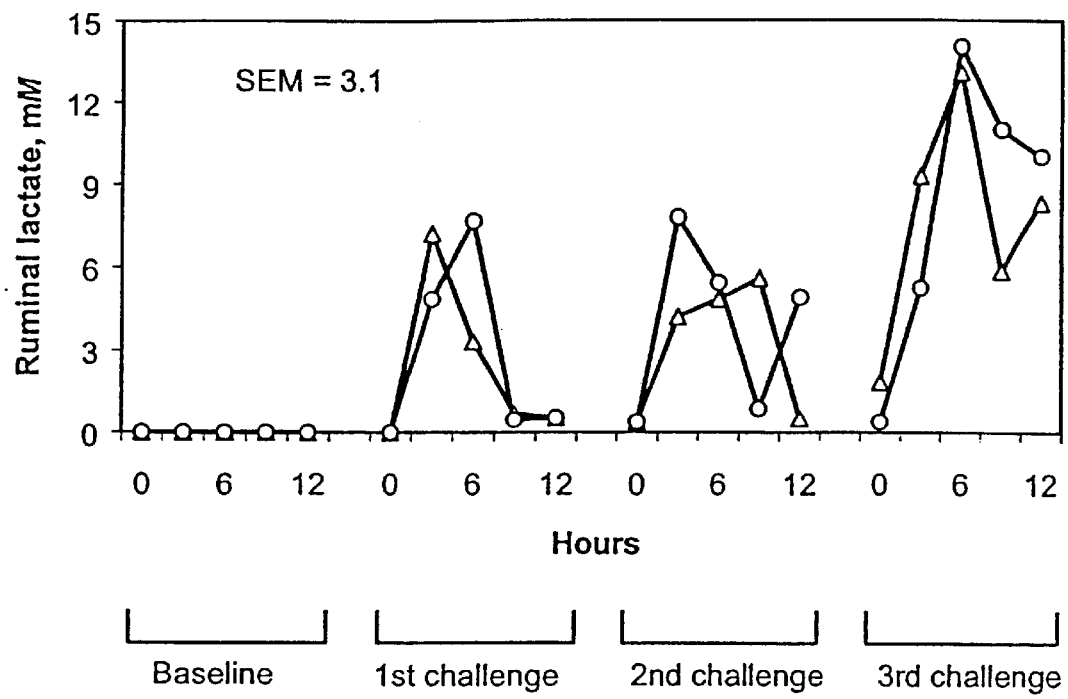
Figure 12. Effect of induced SARA challenge on ruminal lactic acid concentration of cows fed SHSL (O) or control (Δ).

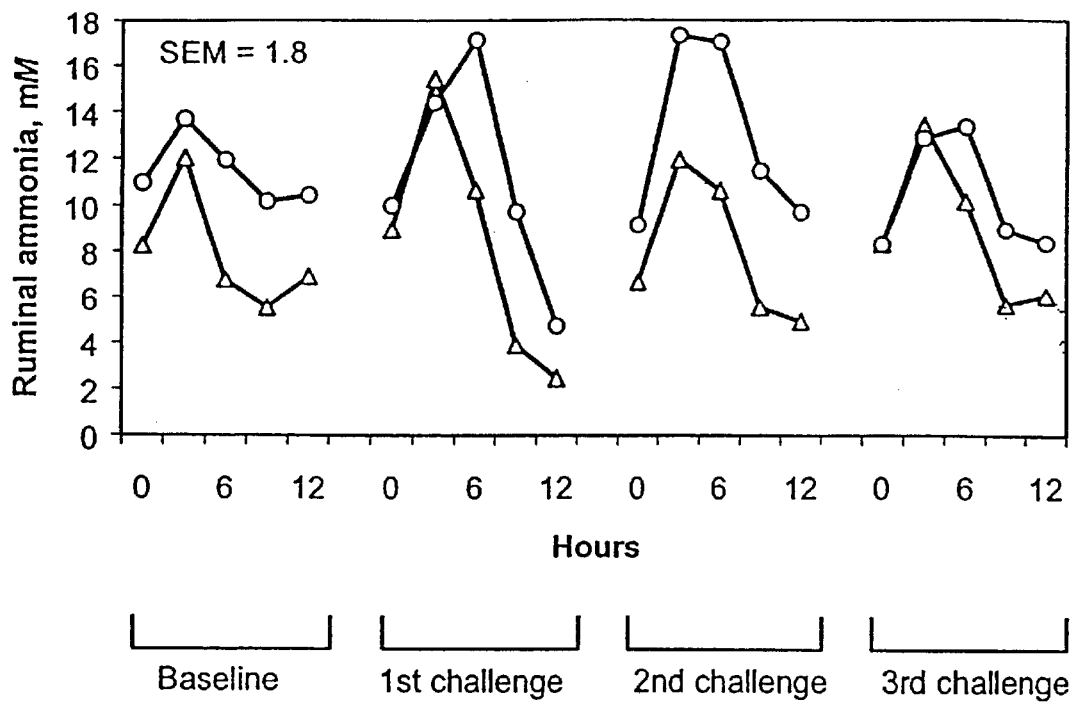
Figure 13. Effect of induced SARA challenge on ruminal ammonia concentrations of cows fed SHSL (O) or control (Δ).

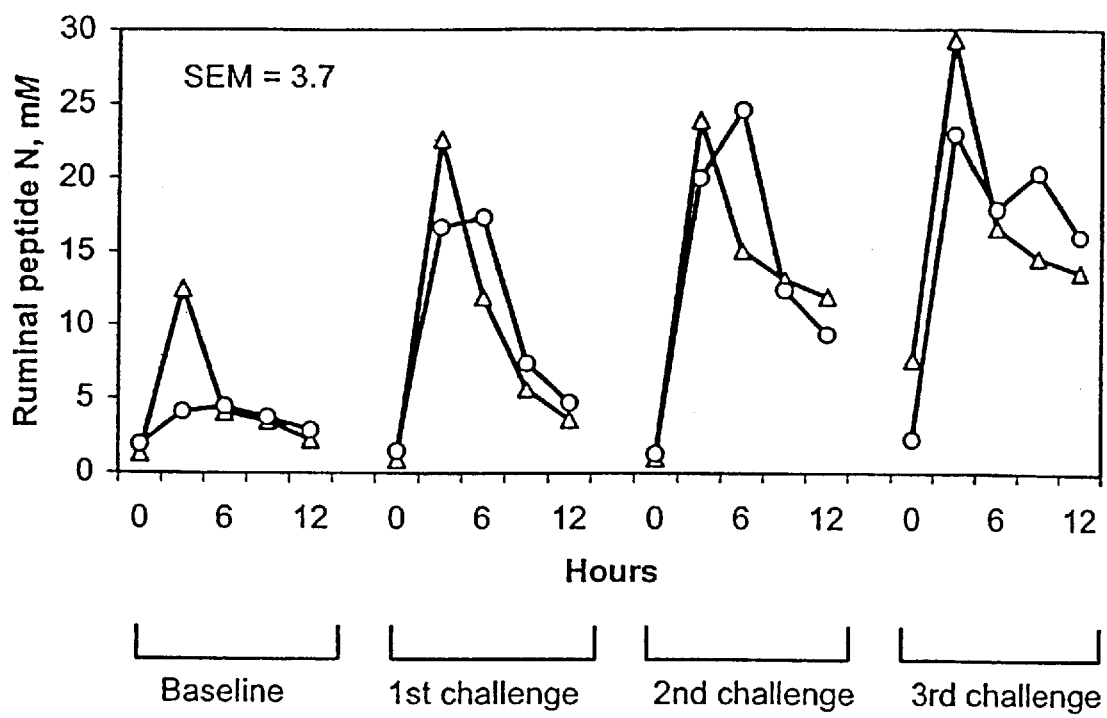
Figure 14. Effect of induced SARA challenge on concentrations of ruminal peptide N of cows fed SHSL (○) or control (Δ).

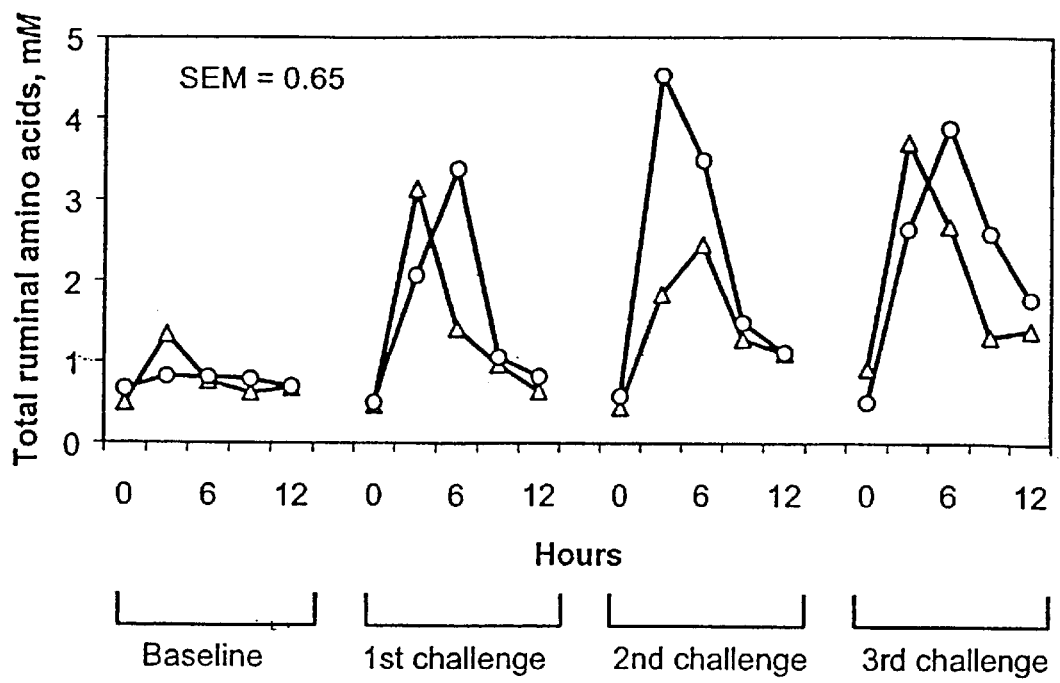
Figure 15. Effect of induced SARA challenge on concentrations of total ruminal amino acids of cows fed SHSL (O) or control (Δ).

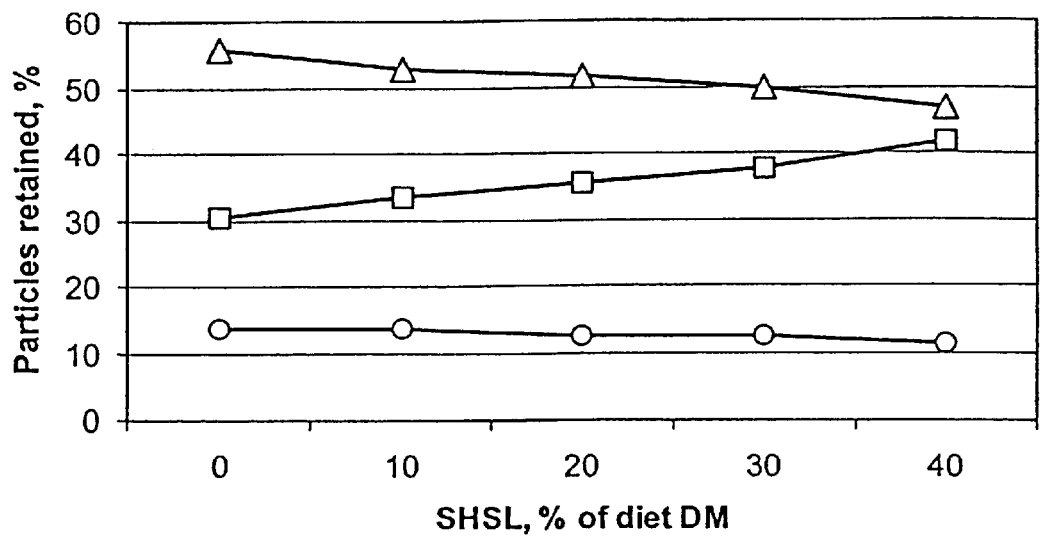
Figure 16. TMR particle size distribution of experimental diets fed during the Acceptability Trial. (Δ = pan, SEM = 0.79; □ = middle sieve, SEM = 0.81; O = top sieve, SEM = 0.53)

LIQUID BYPRODUCT FROM AGRICULTURAL PROCESSING AND FIBROUS PORTION FROM MILLING FEED

CROSS-REFERENCES TO RELATED APPLICATIONS

This application claims priority under 35 U.S.C. §119 (e) to, and hereby incorporates by reference, U.S. Provisional Application No. 60/244,743, filed Oct. 31, 2000.

TECHNICAL FIELD

This invention relates to animal feeds. More particularly, this invention relates to animal feeds that contain an agricultural byproduct and a fibrous portion from milling.

BACKGROUND

Liquid byproducts from agricultural processing may have a number of uses, including uses as animal feeds. Such liquid byproducts may include any byproduct in agricultural processing that is not the primary product derived from a crop, such as corn. Steepwater, which is an agricultural byproduct from the corn wet milling process, is sometimes used as a feed for dairy cows and other livestock. Many other byproducts result from processing agricultural materials, e.g., cheese production, oil seed extraction, alcohol production, sucrose refining, amino acid, organic acid and mono-sodium glutamate production, and paper and wood production. Byproducts from these and other process may be used as animal feed. Many liquid byproducts from agricultural processing, such as steepwater, contain energy and many of the nutrients (for example, crude protein, fiber, minerals, and fat) needed by animals for economical growth and development.

Many agricultural byproducts, such as steepwater, have a lower monetary value than the primary product from the agricultural processing. In addition, the use of many agricultural byproducts as feed may have one or more of the following disadvantages, which are illustrative for steepwater. Steepwater is usually expensive to transport and store due to its physical characteristics. Generally, steepwater is a heavy, wet product with a somewhat viscous character. Some attempts to remove moisture from the steepwater have often not been effective because the expense of the energy necessary to do so and the fact that steepwater usually is hygroscopic, with an affinity for absorbing atmospheric moisture. Thus steepwater is often a thick, highly viscous product that may be difficult to handle. Because of the expense in removing moisture and the tendency of steepwater to absorb ambient moisture from the atmosphere, steepwater is typically handled in a liquid state, which requires liquid storage tanks, tanker trucks or tanker railcars for transportation, and pumps and pipes to move the product.

Secondary fermentation is an additional problem in using steepwater as a feedstuff. For example, when steepwater is stored for an extended period during transportation or prior to use, e.g., 5–30 days, one often encounters foaming and product degradation brought about by the secondary fermentation. Because of secondary fermentation, the product may therefore have a short shelf life. Secondary fermentation may occur in a tanker railcar during transport or in a feeder's storage tank. The fermentation of product in the tank causes the steepwater to foam and typically run out of the top of the tank, which not only makes a mess, but also wastes the product. To control secondary fermentation, users often adjust the pH of the steepwater with acids. Antimicrobial agents, such as sodium metabisulfite, may also be added to reduce steepwater secondary fermentation. Other agricultural byproducts may have some or all of the disadvantages of steepwater or may have still other disadvantages.

There is a need for an animal feed that may use the nutritional benefits of an agricultural byproduct and yet have physical characteristics making the use of the feed convenient.

SUMMARY

One embodiment of the invention is an animal feed. In this embodiment, the animal feed may have a mixture of a liquid byproduct from agricultural processing and a fibrous portion from milling. The liquid byproduct from agricultural processing may, in one embodiment, be steepwater, and the fibrous portion from milling may be soybean hulls.

Another embodiment of the invention is an animal feed containing a mixture of steepwater and soybean hulls, wherein the steepwater comprises about 5 to about 40 percent by weight of the mixture on a dry basis. In yet another embodiment, the animal feed contains about 5 to about 40 percent by weight on a dry basis of steepwater and about 60 to 95 percent by weight on a dry basis of soybean hulls.

Another embodiment of the invention is a method for producing an animal feed. In this embodiment, the method comprises combining a liquid byproduct from agricultural processing with a fibrous portion from milling to form a mixture, and processing the mixture of the agricultural byproduct and the hulls to form a palatable animal feed.

BRIEF DESCRIPTION OF THE DRAWINGS

FIG. 1 depicts the effect of corn steep liquor on urease activity of raw soybean hulls;

FIG. 2 shows the equilibrated moisture content of pellets containing raw soybean hulls and 10, 15, 20, and 25% CSL;

FIG. 3 shows the equilibrated moisture content of pellets containing raw soybean hulls and 10, 15, 20, and 25% CSL;

FIG. 4 depicts the effect of induced SARA challenge on daily milk yields of cows fed SHSL or control;

FIG. 5 shows the effect of induced SARA challenge on ruminal pH of cows fed SHSL or control;

FIG. 6 depicts the effect of induced SARA challenge on total ruminal volatile fatty acid concentrations of cows fed SHSL or control;

FIG. 7 shows the effect of induced SARA challenge on ruminal acetate concentrations of cows fed SHSL or control;

FIG. 8 depicts the effect of induced SARA challenge on ruminal propionate concentrations of cows fed SHSL or control;

FIG. 9 shows the effect of induced SARA challenge on ruminal butyrate concentrations of cows fed SHSL or control;

FIG. 10 depicts the effect of induced SARA challenge on ruminal acetate:propionate ratio of cows fed SHSL or control;

FIG. 11 shows the effect of induced SARA challenge on ruminal branched chain volatile fatty acid concentrations of cows fed SHSL or control;

FIG. 12 depicts the effect of induced SARA challenge on ruminal lactic acid concentration of cows fed SHSL or control;

FIG. 13 shows the effect of induced SARA challenge on ruminal ammonia concentrations of cows fed SHSL or control;

FIG. 14 depicts the effect of induced SARA challenge on concentrations of ruminal peptide N of cows fed SHSL or control;

FIG. 15 shows the effect of induced SARA challenge on concentrations of total ruminal amino acids of cows fed SHSL or control; and FIG. 16 depicts TMR particle size distribution of experimental diets fed during an acceptability trial.

DETAILED DESCRIPTION

A. General Description

Unless otherwise defined, all technical and scientific terms used herein have the same meaning as commonly understood by one of ordinary skill in the art to which this invention belongs. Although methods and materials similar or equivalent to those described herein can be used to practice the invention, suitable methods and materials are described below. All publications, patent applications, patents, and other documents mentioned herein are incorporated by reference in their entirety. In case of conflict, the present specification, including definitions, will control. However, the materials, methods, and examples are contemplated to be illustrative only and not intended to be limiting.

The present invention involves an animal feed containing or made from a mixture of a liquid byproduct from agricultural processing and a fibrous portion from milling. A number of different types of liquid byproducts from agricultural processing and fibrous portions from milling may be used within the scope of the invention, as explained more fully below. Various formulations of the present invention are explained or defined by the 2000 Official Publication, Association of American Feed Control Officials Incorporated, Dr. Alan Hanks, President, Rodney J. Noel, Secretary-Treasurer and Sharon Senesac, Assistant Secretary Treasurer.

The animal feed of the invention may be inexpensive to transport. It may also have a shelf life that is longer than some liquid byproducts from agricultural processing. The present animal feed may also utilize the nutritional advantages of each additive to produce a mixture having a beneficial nutritional profile.

1. The Liquid Byproduct from Agricultural Processing

The present substantially liquid byproduct from agricultural processing may be any byproduct resulting from the processing of an agricultural product, such as corn or soybeans. The term "substantially liquid" is contemplated to describe substances having a sufficient proportion of liquid present to impart flowability at some stage in the processing thereof. Substantially liquid substances may therefore contain significant proportions of solid materials therein. In one embodiment of the invention, steepwater from the wet corn milling industry may be used as the liquid byproduct from agricultural processing. However, other liquid byproducts from processing from other agricultural products may also be used, including but not limited to condensed solubles from agricultural processes, whey, which may be produced during cheese and dairy processing, soapstocks produced from vegetable oil processing, distillers solubles produced during alcohol production, lignin products produced during paper production, molasses from sugar processing, fermentation solubles from the fermentation processing which produces amino acids, organic acids and mono-sodium glutamate, and products resulting from paper and wood production.

The present invention may use steepwater as the substantially liquid byproduct from agricultural processing. Wet milling of corn includes a steeping process. In being wet milled, corn grain is soaked in water for about 30 to 40 hours. Approximately 0.1–0.2 percent by weight sulfur dioxide is added to the water to facilitate the steeping process. The corn kernels then begin to soften and swell. The mild acidity of the water loosens the gluten bonds within the corn and releases the starch. The corn grain is then removed from the steeping tanks for further processing. Some of the moisture from the steep water is then removed to provide condensed steep water with between 35%–55% solids. The condensed steep water is also called condensed corn steep liquor, or steepwater. Different processing plants may have variations in processing, the processing variations resulting in varying analysis of the steepwater produced. Some corn wet milling plants also produce ethanol, with the resulting wet distillers solubles co-product being frequently added to the steepwater. The resulting mixture from wet milling and ethanol production is also referred to as steepwater. As used in this specification, therefore, "steepwater" refers to the steepwater produced from wet corn milling, distillers solubles, corn syrup refinery insolubles, or any mixture thereof Wet milling, fermentation, and manufacture of corn syrup are more fully described in Corn and Corn Improvement, 3d Edition, G. F. Sprague and J. W. Dudley, Editors, American Society of Agronomy, Madison, Wis. (1988) and in Corn: Chemistry and Technology, S. A. Watson and P. E. Ramstad, Editors, American Association of Cereal Chemists, Inc., St. Paul, Minn. (1987).

The substantially liquid byproducts from agricultural processing used within the scope of the invention may be used in a dry or wet form. In other words, although the phrase "liquid" or "substantially liquid" may be contained in the phrase "liquid byproduct from agricultural processing," a substantial portion or all of the moisture may be drained and/or evaporated from the liquid byproduct from agricultural processing for use in the invention. Steepwater, for instance, may be between about 45–60 percent moisture, between about 50–55 percent moisture, or any range subsumed therein. However, a steepwater having a higher or lower moisture content may be used within the scope of the invention as well. Indeed, it is possible to use steepwater that is at or near a 100 percent dry basis within the scope of the present invention.

2. The Fibrous Portion from Milling

In addition to a liquid byproduct from agricultural processing, the animal feed of the invention may also contain a fibrous portion from milling. The term "fibrous portion from milling," as used throughout this specification, refers to the outer seed covering of a fruit, vegetable or grain, or to the portion of fibrous agricultural products from agricultural processing, such as bran, mill byproduct, or pulp. Fibrous portions from milling are commonly used in the animal feed industry as fillers, energy sources, and roughage. In one embodiment of the invention, soybean hulls produced during the processing of soybeans may be used in the mixture of the animal feed. In other embodiments corn bran, oat hulls, cottonseed hulls, rice hulls, rice bran, wheat bran, wheat middlings, beet pulp, or any mixture thereof may be used.

As in the case of the liquid byproduct from agricultural processing portion of the animal feed of the invention, the fibrous portion from milling portion of the animal feed may be in a dry or wet form. Soybean hulls, for instance, may be approximately 90 percent dry (10 percent moisture) in one embodiment. In other embodiments, hulls having a higher or lower moisture contents may be used within the scope of the invention. For example, it is possible to use hulls that are at or near a 100 percent dry basis (0 percent moisture) within the scope of the invention. After the hulls are added to the liquid byproduct from agricultural processing to form a mixture, the mixture may be further processed to produce an animal feed having a desired consistency and moisture content. For example, the animal feed may be produced to have about a 90 percent dry basis in a pellet form.

B. Process for Making the Feed

To make the animal feed of the present invention, the fibrous portion from milling and the liquid byproduct from agricultural processing are added together to form a mixture. The fibrous portion from milling and the liquid byproduct from agricultural processing may be combined in any manner known to those skilled in the art. An animal feed machine, such as a pelletizing, extruding, blocking, or cubing machine, may be used to combine the fibrous portion from milling and the liquid byproduct from agricultural processing. Thus, the form of the present animal feed may vary within the scope of the invention, e.g., pellets, meal, cubes, or blocks.

In an embodiment using a feed machine, the flow rate of each additive into the animal feed machine may be adjusted in order to gain the desired composition of the animal feed of the invention. The resulting product may then be dried and cooled to produce an animal feed having a given dry basis and form. In addition, nutrients or other additives, such as vitamins, minerals, or drugs, may be added to the mixture of the liquid byproduct from agricultural processing and fibrous portion from milling to improve certain physical or nutritional characteristics of the resulting animal feed. Throughout the process, the moisture level and the consistency of the animal feed may be measured such that adjustments may be made to manufacture a product with the desired consistency. For instance, if the desired form of the animal feed of the invention is a pellet, the quality of the pellets may be checked in order to ensure the proper hardness and consistency thereof.

One embodiment of the invention involves combining steepwater and soybean hulls in a pellet mill conditioner, wherein the flow of the soybean hulls into the conditioner remains constant and the steepwater flow rate is adjusted to produce a product having from approximately 5–40 percent steepwater on a dry basis by weight in the final product. Other embodiments of the invention may involve combining steepwater with soybean hulls such that the resulting product has between about 1 and 50 percent steepwater on a dry basis by weight. In yet other embodiments, the steepwater may comprise between about 20 and 35 percent, between about 25 and 30 percent, or about 20, 25, 30, or 35 percent on a dry basis by weight of the resulting product. The resulting product may then be dried and cooled to ambient temperature. The pellet quality of the feed (in an embodiment where the feed is produced in pellet form) may be determined using a standardized pellet durability test (ASAE S-269.3). Although a pellet mill conditioner may be used, there are many different types of processes typically used in the animal feed industry which may be used. These processes include mixing, cubing, blocking, expanding, and extruding.

Table 1 below shows the amount of soybean hulls and steepwater that may be added together to form the resulting composition indicated on a dry matter basis in one embodiment of the animal feed of the invention. Each column indicates a mixture having the specified amount of steepwater ("steep") and the specified percentage of soybean hulls. The "As Is" numbers refer to the amounts of steepwater and soybean hulls used when each of these components contain some moisture, as typically is the case during common use. In the example of Table 1, the soybean hulls are 91 percent solids and 9 percent moisture on an "as is" basis, and the steepwater is 50 percent moisture and 50% solids on an "as is" basis. It should be noted that the compositions of each of these components may vary widely within the scope of the invention. In Table 1, the term "soy hulls" refers to soybean hulls and the term "Steep" refers to a blend of steepwater from wet milling and distiller's solubles.

Tables 2 and 3 below summarize various properties of representative examples of an embodiment of the invention containing a mixture of steepwater and soybean hulls. The percentage of steepwater and soybean hulls differs in each column. Table 2 also summarizes various properties and a nutritional analysis of one variety of steepwater and one variety of soybean hulls. It should be noted that the nutritional properties disclosed in Tables 2 and 3 are representative only and that these properties may vary in other embodiments of the invention containing steepwater and soybean hulls. In addition, nutritional properties may vary widely for embodiments of the invention containing liquid byproducts from agricultural processing other than steepwater and for embodiments of the invention containing fibrous portions from milling other than soybean hulls.

TABLE 1

SOYBEAN HULLS AND STEEPWATER CALCULATIONS TO CONVERT DRY MATTER RATIONS TO "AS IS" RATIOS IN ONE EMBODIMENT OF THE INVENTION

Soybean hulls % Dry Matter 91.00%
Steepwater % Dry Matter 50.00%

|  | Control | 5% Steep | 10% Steep | 15% Steep | 20% Steep | 25% Steep | 30% Steep | 35% Steep |
|---|---|---|---|---|---|---|---|---|
| Pounds of Each Ingredient on a 100% Dry Matter Basis | | | | | | | | |
| Soyhulls | 100.00 | 95.00 | 90.00 | 85.00 | 80.00 | 75.00 | 70.00 | 65.00 |
| Steepwater | 0.00 | 5.00 | 10.00 | 15.00 | 20.00 | 25.00 | 30.00 | 35.00 |
| Total Dry Matter Weight in Pounds | 100.00 | 100.00 | 100.00 | 100.00 | 100.00 | 100.00 | 100.00 | 100.00 |

TABLE 1-continued

SOYBEAN HULLS AND STEEPWATER CALCULATIONS TO CONVERT DRY MATTER RATIONS TO "AS IS" RATIOS IN ONE EMBODIMENT OF THE INVENTION
Soybean hulls % Dry Matter 91.00%
Steepwater % Dry Matter 50.00%

|  | Control | 5% Steep | 10% Steep | 15% Steep | 20% Steep | 25% Steep | 30% Steep | 35% Steep |
|---|---|---|---|---|---|---|---|---|
| Pounds of Each Ingredient on an "As Is" Basis | | | | | | | | |
| Soyhulls | 109.89 | 104.40 | 98.90 | 93.41 | 87.91 | 82.42 | 76.92 | 71.43 |
| Steepwater | 0.00 | 10.00 | 20.00 | 30.00 | 40.00 | 50.00 | 60.00 | 70.00 |
| Total "As Is" Weight in Pounds | 109.89 | 114.40 | 118.90 | 123.41 | 127.91 | 132.42 | 136.92 | 141.43 |
| "As Is" Percentage of Each Ingredient | | | | | | | | |
| Soyhulls | 100% | 91.26% | 83.18% | 75.69% | 68.73% | 62.24% | 56.18% | 50.51% |
| Steepwater | 0% | 8.74% | 16.82% | 24.31% | 31.27% | 37.76% | 43.82% | 49.49% |

TABLE 2

ANALYSIS OF SOYBEAN HULLS & CORN STEEPWATER IN ONE EMBODIMENT OF THE INVENTION

| Characteristic | Unit of Measure | Raw Soybean Hulls | Soybean Hulls and 5% Steepwater | Soybean Hulls and 10% Steepwater | Raw Steepwater |
|---|---|---|---|---|---|
| Moisture | % | 9.00 | 6.80 | 10.50 | 47.50 |
| Dry Matter | % | 91.00 | 93.20 | 89.50 | 52.50 |
| Crude Protein | % | 13.50 | 15.30 | 16.80 | 44.20 |
| Adjusted Crude Protein | % | 13.50 | 15.30 | 16.80 | 44.20 |
| Soluble Protein | % | 32.00 | 36.00 | 37.00 | 92.00 |
| Degradable Protein | % | 56.00 | 57.00 | 61.00 | 91.00 |
| Acid Detergent Fiber | % | 43.30 | 35.30 | 37.60 | 0.70 |
| Neutral Detergent Fiber | % | 58.70 | 51.00 | 47.10 | 2.30 |
| NSC | % | 19.50 | 24.90 | 26.70 | 42.40 |
| Crude Fat | % | 2.90 | 3.20 | 3.60 | 0.60 |
| Ash | % | 5.49 | 5.56 | 5.86 | 10.52 |
| TDN | % | 66.00 | 68.00 | 69.00 | |
| Net Energy Lactation | Mcal/Lb | 0.69 | 0.72 | 0.73 | |
| Net Energy | Mcal/Lb | 0.64 | 0.69 | 0.71 | |
| Net Energy Gain | Mcal/Lb | 0.37 | 0.42 | 0.44 | |
| Calcium | % | 0.68 | 0.68 | 0.62 | 0.08 |
| Phosphorus | % | 0.18 | 0.34 | 0.40 | 2.04 |
| Magnesium | % | 0.27 | 0.31 | 0.34 | 0.75 |
| Potassium | % | 1.42 | 1.50 | 1.54 | 2.89 |
| Sodium | % | 0.042 | 0.066 | 0.070 | 0.174 |
| Iron | PPM | 592 | 536 | 503 | 119 |
| Zinc | PPM | 44 | 61 | 54 | 101 |
| Copper | PPM | 11 | 10 | 10 | 6 |
| Manganese | PPM | 30 | 36 | 31 | 40 |
| Molybdenum | PPM | <1 | 2 | <1 | 3.33 |
| Sulfur | % | 0.12 | 0.17 | 0.31 | 0.06 |
| Chloride Ion | % | 0.04 | 0.10 | 0.12 | 0.36 |
| HTDN | % | 38.00 | 48.00 | 45.00 | |
| HDE | Mcal/Lb | 0.77 | 0.97 | 0.91 | |

TABLE 3

ANALYSIS OF SOYBEAN HULLS & CORN STEEPWATER

| Characteristic | Unit of Measure | Soybean Hulls and 15% Steepwater | Soybean Hulls and 20% Steepwater | Soybean Hulls and 25% Steepwater |
|---|---|---|---|---|
| Moisture | % | 10.90 | 11.60 | 7.60 |
| Dry Matter | % | 89.10 | 88.40 | 92.40 |
| Crude Protein | % | 17.90 | 18.40 | 19.60 |
| Adjusted Crude Protein | % | 17.90 | 18.40 | 19.60 |

TABLE 3-continued

ANALYSIS OF SOYBEAN HULLS & CORN STEEPWATER

| Characteristic | Unit of Measure | Soybean Hulls and 15% Steepwater | Soybean Hulls and 20% Steepwater | Soybean Hulls and 25% Steepwater |
|---|---|---|---|---|
| Soluble Protein | % | 44.00 | 46.00 | 50.00 |
| Degradable Protein | % | 63.00 | 66.00 | 68.00 |
| Acid Detergent Fiber | % | 29.70 | 32.60 | 35.40 |
| Neutral Detergent Fiber | % | 46.70 | 42.00 | 44.10 |
| NSC | % | 25.90 | 29.90 | 26.40 |
| Crude Fat | % | 3.60 | 3.40 | 3.10 |
| Ash | % | 6.01 | 6.26 | 6.83 |
| TDN | % | 69.00 | 70.00 | 69.00 |
| Net Energy Lactation | Mcal/Lb | 0.73 | 0.74 | 0.72 |
| Net Energy | Mcal/Lb | 0.71 | 0.73 | 0.70 |
| Net Energy Gain | Mcal/Lb | 0.44 | 0.46 | 0.43 |
| Calcium | % | 0.57 | 0.54 | 0.51 |
| Phosphorus | % | 0.50 | 0.59 | 0.64 |
| Magnesium | % | 0.36 | 0.40 | 0.41 |
| Potassium | % | 1.56 | 1.64 | 1.72 |
| Sodium | % | 0.138 | 0.156 | 0.111 |
| Iron | PPM | 473 | 461 | 421 |
| Zinc | PPM | 60 | 66 | 64 |
| Copper | PPM | 8 | 6 | 8 |
| Manganese | PPM | 31 | 35 | 33 |
| Molybdenum | PPM | <1 | <1 | <1 |
| Sulfur | % | 0.27 | 0.32 | 0.32 |
| Chloride Ion | % | 0.30 | 0.31 | 0.17 |
| HTDN | % | 55.00 | 52.00 | 48.00 |
| HDE | Mcal/Lb | 1.11 | 1.04 | 0.97 |

In order to form the exemplary embodiments of the invention set forth in the tables above, a pellet mill conditioner may be used to combine steepwater and soybean hulls into a pellet form. The flow rate of soybean hulls into the pellet mill conditioner may remain constant, while the amount of steepwater may be varied in the different embodiments. The amount of steepwater added can be 5, 10, 15, 20, and 25 percent on a dry basis of the total resulting mixture (calculated as per Tables 2 and 3). The resulting pellets can then be dried and cooled to ambient temperature and 10–11 percent moisture. The pellet quality can be determined using a standardized pellet durability test (ASAE S-269.3, 1998). As the amount of steepwater is increased, the pellets become harder and more in line with the consistency commonly used in the feed industry.

Urease and Trypsin Inhibitor Inactivation

Soybeans may contain two primary anti-nutritional factors that reduce the value of the use of soybeans as an animal feed. These two factors are trypsin inhibitors and urease, both of which may be harmful to animals under certain circumstances. Urease is a nickel-dependant metalloenzyme that catalyzes the hydrolysis of urea to ammonia and carbamate. The carbamate may then spontaneously hydrolyze to form carbonic acid and a second molecule of ammonia, as illustrated in the following formula:

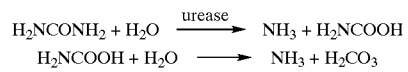

$$H_2NCONH_2 + H_2O \xrightarrow{urease} NH_3 + H_2NCOOH$$
$$H_2NCOOH + H_2O \longrightarrow NH_3 + H_2CO_3$$

Trypsin is an enzyme that is secreted by the pancreas in most animals and functions in the digestion of proteins. Trypsin inhibitor in soybeans is a monomeric protein containing 181 amino acid residues in a single polypeptide chain cross-linked by two disulfide bridges. Soybean trypsin inhibitor forms a 1:1 stoichiometric complex with trypsin. Upon formation of this complex, trypsin may cleave a single arginine-isoleucine bond on the inhibitor, thereby reducing or eliminating the effect of trypsin in the digestion of proteins. Dissociation of this complex may yield a modified or native form of the inhibitor. Soybean trypsin inhibitor inhibits trypsin, and to a lesser extent, soybean trypsin inhibitor inhibits chymotrypsin and plasmin.

Urease and trypsin inhibitors may both be deactivated from soybean meal during a heating step during soybean processing. Soybean hulls, however, are frequently separated from soybeans early in soybean processing and therefore may not go through the same heating step as the soybean meal. The urease and trypsin inhibitors in soybean hulls, therefore, are sometimes not deactivated during soybean processing. Consequently, the possibility of harm to animals may result if unheated soybean hulls are fed to thereto. Although soybean hulls may be heated to inactivate the urease, heating requires energy, thereby raising the costs of soybean hulls which have undergone this step.

Diets for ruminants, in particular diets for beef and dairy cattle, frequently contain urea as a source of nitrogen to lower the protein cost for the animal. However, ammonia in sufficient quantities can be toxic to animals. If an animal consumes feed with both urea and urease, the animal may become sick and may even die due to the ammonia release (see formula above). If the soybean hulls are mixed in a complete feed with the urea, the mixture may give off ammonia and the animal would most likely not eat the feed because of the very unpleasant ammonia aroma. Although the animal will live, the feeder would have to discard the feed as waste. However, if soybean hulls containing urease and an animal feed containing urea were to be fed separately to an animal, then ammonia could be generated inside the animal, possibly resulting in death.

Toasting soybean hulls at a sufficiently high temperature may deactivate the urease and trypsin inhibitor activity. If the soybean hulls are toasted sufficiently to inactivate the urease, then the soybean hulls can be used in most animal diets without concerns about the negative effects of urease and trypsin inhibitors. Toasting, however, requires energy and, hence, can be an expensive process. Consequently, many soybean processors choose to market untoasted hulls. Thus, untoasted soybean hulls are usually undesirable as feed ingredients and the value and marketability of the hulls are limited.

When steepwater is added to soybean hulls to produce an animal feed in pellet form, the urease activity declines. In some embodiments, the urease activity declines linearly until it is effectively inactivated by the steepwater. Although the cause of the inactivation of the urease activity is not known, it is believed that the urease may be inactivated by a reaction with components in the steepwater or by heating during the pelletizing process. In any event, in one embodiment of the invention, the soybean hulls need not be toasted in a separate process prior to being mixed with steepwater to form an animal feed of the invention.

Another advantage of an embodiment of the invention having steepwater and soybean hulls is that the trypsin inhibitor is also deactivated. Trypsin inhibitor is deactivated at a lower temperature than urease. Hence, typical feed pelletizing or extruding may deactivate the trypsin inhibitors in the soybean hulls. Thus combining steepwater and soybean hulls in a pellet form may deactivate both the urease activity and the trypsin inhibitor, making the product safe for animals to eat.

WORKING EXAMPLES

Feed Milling Experiments

Random samples of raw soybean hulls, steepwater, and pellets were collected at approximately 15-minute intervals during pellet production. These pellet samples were composited and hydrolyzed in 6 N HCl for 24 hours at 105 degrees C. Concentrations of individual amino acids were then measured. The amino acids were separated using cation exchange capacity chromatography, then measured by fluorimetry following post-column o-phthalaldehyde derivitization (Beckman System Gold; Beckman Inc., Palo Alto, Calif.).

Nutrient compositions of raw soybean hulls (RSH), corn steep liquor (CSL), and pellets made from 75% RSH and 25% CSL (SHSL) are presented in Table 4. Raw soybean hulls possessed a nutrient profile nearly identical to NRC (2001) values. The CSL contained equal portions of byproducts from starch extraction and ethanol production facilities (Minnesota Corn Processors, Inc., Columbus, Nebr.). The nutrient profile of SHSL is best described as a ruminally degradable protein source that is high in fiber. The amino acid compositions of RSH, CSL, and SHSL are presented in Table 5. The leucine and lysine concentration of RSH were higher than those reported in NRC (2001). Proportions of essential and non-essential amino acids within RSH and CSL were similar, but concentrations of most amino acids in CSL were two-fold greater than those of RSH. In addition, the methionine content of CSL was nearly 13-fold that of RSH. According to NRC (2001), the SHSL product is higher in methionine than SH and corn grain, but lower than alfalfa hay. Because methionine is often the first limiting amino acid of lactating dairy diets (Schwab et al., 1992), it may become a consideration when SHSL is included in the diet.

TABLE 4

Nutrient composition of raw soybean halls, corn steep liquor, and a pellet containing 75% raw soybean halls, 25% corn steep liquor (DM basis; SHSL).

| Item | Raw soyhulls | Steep liquor | SHSL |
|---|---|---|---|
| DM, % | 91.0 | 52.5 | 87.0 |
| CP, % | 13.5 | 44.2 | 24.2 |
| Soluble protein, % | 32.0 | 92.0 | 39.8 |
| RUP, % of CP | 44.0 | 9.0 | 36.0 |
| ADF, % | 43.3 | 0.7 | 28.9 |
| NDF, % | 58.7 | 2.3 | 36.7 |
| NFC[1], % | 19.5 | 42.4 | 28.2 |
| Fat, % | 2.9 | 0.8 | 2.5 |
| Ash, % | 5.4 | 10.5 | 7.5 |
| NEL, Mcal/Kg | 1.50 | 1.87 | 1.61 |
| Ca, % | 0.68 | 0.08 | 0.45 |
| P, % | 0.18 | 2.4 | 0.75 |
| Mg, % | 0.27 | 0.75 | 0.44 |
| K, % | 1.42 | 2.89 | 1.96 |
| Na, % | 0.4 | 0.17 | 0.18 |
| S, % | 0.12 | 1.90 | 0.48 |
| Fe, mg/kg | 592 | 119 | 402 |
| Zn, mg/kg | 44 | 101 | 68 |
| Mn, mg/kg | 30 | 40 | 36 |
| Cu, mg/kg | 11 | 6 | 9 |

[1]Non-fiber carbohydrate = 100 minus (% CP + % NDF + % Histidine + % Ash).

TABLE 5

Amino acid profiles of raw soybean hulls, corn steep liquor, and a pellet containing 75% raw soybean hulls, 25% corn steep liquor (DM basis; SHSL).

| | % of DM | | | |
|---|---|---|---|---|
| | Raw soybean | Corn steep | SHSL | |
| Amino acid | hulls | liquor | Predicted[1] | Measured |
| Essential | | | | |
| Lys | 1.34 | 2.19 | 1.55 | 1.85 |
| His | 0.52 | 1.66 | 0.81 | 1.11 |
| Arg | 1.06 | 2.71 | 1.47 | 1.86 |
| Thr | 0.69 | 1.80 | 0.97 | 1.14 |
| Val | 0.88 | 2.74 | 1.35 | 1.58 |
| Met | 0.08 | 1.07 | 0.33 | 0.23 |
| Ile | 0.77 | 1.76 | 1.02 | 1.31 |
| Leu | 1.37 | 4.25 | 2.9 | 2.50 |
| Phe | 0.78 | 1.79 | 1.03 | 1.36 |
| Total EAA[2] | 7.49 | 19.97 | 10.61 | 12.94 |
| Non-essential | | | | |
| Asx | 2.03 | 4.15 | 2.56 | 3.24 |
| Ser | 1.20 | 2.42 | 1.51 | 1.76 |
| Glx | 2.40 | 7.1 | 3.78 | 4.95 |
| Gly | 1.49 | 2.64 | 1.78 | 1.90 |
| Ala | 0.91 | 3.69 | 1.61 | 1.81 |
| Tyr | 0.75 | 1.56 | 0.95 | 1.07 |
| Total NEAA[3] | 8.78 | 22.37 | 12.18 | 14.73 |
| Total α-amino acids | 16.27 | 42.34 | 22.79 | 27.67 |

[1](75% × raw soybean hull AA content) + (25% × corn steep liquor AA content).
[2]EAA = essential amino acids.
[3]NEAA = non-essential amino acids.

Four experiments were conducted to determine the optimal procedure to combine steepwater and raw soybean hulls into a pelleted feedstuff. These protocols used a 30 horsepower California Pellet Mill (CPM, Crawfordsville, Ind.) 1000 series "Master HD" model equipped with a standard conditioner and a 4.76 mm×31.75 mm (hole diameter× effective die thickness) die. A liquid pump (Robins and Myers, Inc., Springfield, Ohio) was used to propel the steepwater into a pellet mill conditioner (or expander). All pellets were then conveyed to a California Pellet Mill horizontal cooler equipped with a steam heat exchanger that generated a temperature of 104 degrees C. to assist in pellet drying. The pellets remained in the CPM horizontal cooler for about 6.5 minutes, after which the pellets were conveyed by a bucket elevator to a sack-off bin, packaged into paper bags (approximately 18 kilograms per bag), placed on pallets and stored for use.

The pellet mill feeder was calibrated by incrementally increasing the flow rate of raw soybean hulls and recording corresponding screw speed (rpm) with a photo/contact digital tachometer. Throughput was recorded in triplicate at 10-second intervals at four differing feeder screw speeds. A linear trend line was established by regressing throughput on rpm of the feeder screw. This linear model was used to predict flow rates of raw soybean hulls and mixer mash to the pellet mill conditioner at speeds within the bounds of the linear range.

The liquid pump was calibrated in the same manner to determine the flow rate of steepwater to the pellet mill conditioner and expander. Corn steepwater was pumped into a tared weigh bucket at various pump speeds. The speed (rpm) of the liquid pump and steepwater output (kg/10 seconds) was recorded in triplicate at various rpm and a trend line was fed to the data. The trend line allowed the model to predict flow rates at pump speeds within the linear range. Pellet quality was measured using the standard determination for pellet durability index (PDI; ASAE, 1987) and a modified procedure using five, 13 mm hexagonal nuts added with the pellets. Electrical data were recorded using an amp-volt meter (model DMI, Amprobe Instrument, Lynbrook, N.Y.).

Corn steep liquor was pumped into the pellet mill conditioner, where it was blended with raw soybean hulls. Conditioning speed and temperature remained constant at 28 rpm and 66 degrees C., respectively. To alter pellet composition, the flow rate of steepwater to the pellet mill conditioner was adjusted while the flow rate of the raw soybean hulls remained constant. The speed of the liquid pump was adjusted to produce pellets containing 0, 5, 8, 10, 12, and 15 percent steepwater on a dry matter basis.

Results from the pellet mill conditioner experiments suggested that steepwater inclusion levels greater than 15% (dry matter basis) could be attained, because pellet quality was not compromised by steepwater inclusions of up to 15% pellet dry matter. In order to use a liquid pump capable of higher pumping rates, a Forberg paddle mixer (Ontario, Canada) was used to mix steepwater and raw soybean hulls at 10% and 90% (drop basis), respectively. This mixer mash was conveyed to the pellet mill and the pellet mill feeder screw was re-calibrated as described above. Pellets containing steepwater concentrations of 10, 15, 20, and 25 percent (dry matter basis) were then made. Conditioning speed and temperature were maintained as described above, with respect to the pellet mill conditioner protocol.

The use of a 100 horsepower expander (Model OE15.2, Amandus-Kahl, Hamburg, Germany) was evaluated as an alternative method of thermal processing steepwater and raw soybean hulls prior to pelleting. An expander operates in a similar manner as a single screw extruder. However, the expander requires less energy and maintenance input. The feed is first conditioned, then passed through a thin gap between a cone-shaped device and a cone ring, thereby providing a secondary, high shear, conditioning process. The amount of thermal processing due to frictional force is controlled by using a hydraulic cylinder to adjust the gap width. A Forberg paddle mixer was used to blend steepwater as described above. The mixer mash was conveyed to the expander and cone pressure was maintained at 7.0 kg/cm$^2$. The flow rate of the mixer mash (10% steepwater, 90% raw soybean hulls, dry weight basis) through the expander remained constant and changes in the flow rate of steepwater produced expander mash containing 10, 15, and 20 percent steepwater (dry matter basis). The expander mash bypassed the pellet mill conditioner and was deposited directly into the pellet die chamber. The final feed manufacturing experiment evaluated the effect of expander cone pressure on pellet quality. During this experiment, the expander mash was treated with cone pressures of 10.5, 14.0, 17.6, and 21.0 kg/cm$^2$ prior to delivery to the pellet die chamber.

The inclusion of CSL (up to 25% dry matter (DM)) during the Pellet Mill Conditioner and Mixer Mash/Conditioner experiments improved both standard and modified PDI (Tables 6 and 7). Generally, ingredients high in proteins and fiber are more easily pelleted (Boerner, 1992). Hence, the proteins and fiber of CSL and RSH complemented each other during the pelleting process. Researchers (Briggs et al., 1999; Wood, 1987) have previously recognized the importance of protein and the binding properties of feeds. Briggs et al. (1999) reported an increase in pellet quality when protein was increased from 18% to 24% of pellet DM. Moritz et al. (In press) reported improvements in PDI when water was added to corn-soybean based broiler diets. The CSL used in this study contained approximately 45% moisture, which also may have contributed to the observed improvements in PDI. Energy consumption for the pellet mill was 21.7 and 15.0 kWh/t for pellets containing 0% and 25% CSL (DM basis), respectively. The moisture contributed by CSL and steam derived from conditioning would provide lubrication during pelleting, which would reduce roll wear, electrical energy expenditure, and extend the life of the die. Corn steep liquor conditions up to 25% DM increased production rate without sacrificing pellet quality during the Pellet Mill Conditioner and Mixer Mash/Conditioner experiments.

TABLE 6

Effect of corn steep liquor on feed mill performance and pellet quality during pellet milk conditioner experiments.

| | Corn steep liquor inclusion, % of dry matter | | | | | |
|---|---|---|---|---|---|---|
| Item | 0 | 5 | 8 | 10 | 12 | 15 |
| Production rate, kg/h | 489 | 534 | 565 | 587 | 609 | 644 |
| Electrical energy | | | | | | |
| Amps | 18.2 | 17.2 | 16.4 | 15.6 | 15.1 | 14.6 |
| Volts | 436.4 | 436.3 | 436.4 | 436.4 | 435.8 | 435.7 |
| kWh/t | 21.7 | 18.8 | 17.0 | 15.5 | 14.5 | 13.2 |
| PDI[1] | 91.3 | 95.6 | 96.2 | 96.6 | 96.1 | 96.7 |
| PDIm[2] | 88.6 | 94.8 | 95.0 | 96.2 | 96.6 | 96.2 |

[1]Standard pellet durability index.
[2]Modified pellet durability index using five 13 mm hexagonal nuts.

TABLE 7

Effect of corn steep liquor on feed mill performance and pellet quality during mixer mash/conditioner experiments.

| | Corn steep liquor inclusion, 15% of dry matter | | | |
|---|---|---|---|---|
| Item | 10 | 15 | 20 | 25 |
| Production rate, kg/h | 387 | 424 | 467 | 515 |
| Electrical energy | | | | |
| Amps | 15.9 | 14.8 | 14.2 | 13.2 |
| Volts | 438.2 | 438.9 | 438.9 | 438.7 |
| kWh/t | 24.1 | 20.5 | 17.8 | 15.0 |
| PDI[1] | 96.7 | 97.1 | 97.1 | 97.8 |
| PDIm[2] | 97.0 | 96.5 | 96.8 | 97.2 |

[1] Standard pellet durability index.
[2] Modified pellet durability index using five 13 mm hexagonal nuts.

Increasing the level of CSL improved standard and modified PDI during the Expander experiment (Table 8). Expanders are known to improve pellet quality, production capacity, and feed hygiene (Fairchild, 1994). During the expander experiment, standard PDI was minimally affected by the level of CSL, but the modified PDI increased from 93.4% to 97.3% for pellets containing 10% and 20% CSL, respectively. Similar to the pellet mill conditioner experiments, CSL reduced pellet mill energy consumption from 14.4 to 11.1 kWh/t for 10% and 20% CSL (DM basis) inclusions, respectively. However, expander energy usage was not influenced in this study. As expected, increasing expander cone pressure did not influence standard and modified PDI (Table 9). Traylor et al. (1999) reported increases in standardized PDI ($P<0.05$) and minimal improvements and modified PDI when high fiber (50% wheat middlings, as-fed) diets were treated with increasing cone pressures of 0, 11.7, 24.4, 35.2 kg/cm². Contrary to the results of this study, Traylor et al. (1999) reported a linear decrease in pellet mill electrical energy consumption as cone pressure increased. The results of this study suggested expander technology may not the most energy efficient method to produce a pelleted feedstuff containing RSH and CSL, at least under the conditions used.

TABLE 8

Effect of corn steep liquor on feed mill performance and pellet quality during expander experiments.

| | Corn steep liquor inclusion, % of dry matter | | |
|---|---|---|---|
| Item | 10 | 15 | 20 |
| Production rate, kg/h | 636 | 698 | 768 |
| Electrical energy | | | |
| Expander | | | |
| Amps | 54.7 | 59.7 | 55.3 |
| Volts | 442.0 | 441.8 | 442.1 |
| kWh/t | 50.8 | 50.4 | 42.5 |
| Pellet mill | | | |
| Amps | 15.7 | 14.9 | 14.6 |
| Volts | 437.4 | 437.6 | 437.5 |
| kWh/t | 14.4 | 12.5 | 11.1 |
| PDI[1] | 94.7 | 96.3 | 97.6 |
| PDIm[2] | 93.4 | 95.8 | 97.3 |

[1] Standard pellet durability index.
[2] Modified pellet durability index using five 13 mm hexagonal nuts.

TABLE 9

Effect of expander cone pressure on feed mill performance and pellet quality during expander cone pressure experiments.

| | Expander cone pressure (kg/cm²) | | | | |
|---|---|---|---|---|---|
| Item | 7.0 | 0.5 | 14.0 | 17.6 | 21.0 |
| Production rate, kg/h | 768 | 768 | 768 | 768 | 768 |
| Electrical energy | | | | | |
| Expander | | | | | |
| Amps | 55.3 | 60.5 | 63.8 | 72.1 | 90.8 |
| Volts | 442.1 | 443.7 | 443.5 | 443.3 | 442.5 |
| kWh/t | 42.5 | 46.7 | 49.2 | 55.6 | 69.8 |
| Pellet mill | | | | | |
| Amps | 14.6 | 14.9 | 14.8 | 14.9 | 13.9 |
| Volts | 437.5 | 439.5 | 439.4 | 439.4 | 439.1 |
| kWh/ton | 11.1 | 11.4 | 11.3 | 11.4 | 10.6 |
| PDI[1] | 97.6 | 97.2 | 97.4 | 97.7 | 98.0 |
| PDIm[2] | 97.3 | 96.8 | 97.0 | 97.4 | 97.3 |

[1] Standard pellet durability index.
[2] Modified pellet durability index using five 13 mm hexagonal nuts.

The feed mill production data and pellet quality evaluations indicated that pellets containing 75% raw soybean hulls and 25% steepwater (dry matter basis) could be efficiently produced. However, to eliminate the use of the Forberg paddle mixer, a higher capacity pump (Robins and Myers, Inc., Springfield, Ohio) was used to enable steepwater inclusions up to 25% during the pellet mill conditioner experiment.

Samples containing 0, 5, 10, 15, 20, and 25 percent steepwater (dry matter basis) were assessed for urease activity using SOY-CHEK. A 2 g sample was saturated with SOY-CHEK, gently stirred, and allowed to stand for five minutes. Samples were then scored using the scale provided (1=very active; 6=fully cooked). Samples were also ground through a 1-mm screen in a Wiley mill. Urease activity was determined from the ground samples using the AACC method for urease activity (AACC, 1983). This procedure is based on change in pH (relative to blank), a higher pH change indicating higher urease activity.

The function of urease is to hydrolyze urea into $NH_3$ and $CO_2$. This reaction is beneficial in ruminants because the free $NH_3$ generated can be incorporated into microbial cell protein. However, when the rate of urea hydrolysis exceeds the rate of $NH_3$ utilization by ruminal microorganisms, ruminal $NH_3$ concentrations increase, thereby causing an increase in $NH_3$ absorption into the bloodstream which can result in urea toxicity (Bartley et al., 1976). Because raw soybean hulls have high urease activity, caution must be exercised when these materials are included in diets containing urea.

The effect of CSL on urease activity is shown in FIG. 1. Urease activity decreased as the level of CSL increased in the RSH/CSL mixture. Feed moisture content and duration of thermal processing are known to denature protein and to reduce or inhibit urease activity in soybean products (McNaughton and Reece, 1980). Because the conditioning temperature and time were maintained throughout all CSL inclusions, the effects of these variables on urease activity were deemed negligible. The addition of 25% CSL lowered pellet pH from 6.5 to 4.7, which may be responsible for the inhibitory effect of CSL on urease activity. The inhibitory effect of CSL on urease activity of RSH would enable the use of SHSL in diets containing urea.

Equilibrium moisture content (EMC) was determined on pellet samples containing four levels of steepwater (10, 15, 20, and 25%, dry matter basis). Samples were collected from previous Pellet Mill Conditioner and Mixer Mash/Conditioner experiments. Two environmentally controlled chambers were maintained at 10 degrees C. and 30 degrees C. to simulate winter and summer conditions. Ten desiccators were used to maintain five different relative humidity (RH) levels within each chamber (in duplicate). Saturated salt solutions were used to control relative humidity according to Winston and Bates (1960). Relative humidity levels and salts used were 67 (NaBr), 75 ($NH_4NO_3$), 82 ($NH_4NO_3$+ $AgNO_3$), 85 (($NH_4$)$_2SO_4$), and 90 (KCl) in the 10 degree C. chamber and 69 ($NaNO_2$), 71 ($Na_2CrO_4 4H_2O$), 77 (NaCl+KCl), 81 (NaCl), 86 (($NH_4$)$_2SO_4$) in the 30 degree C. chamber. Pellet samples were air-equilibrated in the laboratory at 20 degrees C. to establish a homogeneous dry matter percentage (93%). Samples (about 9.5 grams) of each steepwater inclusion level were placed in baskets made from fine wire screen. Each steepwater inclusion level was replicated in duplicate within each chamber and desiccator. Weights of the sample and wire basket were recorded at the start of the experiment and at three-day intervals. When the change in weight was less than 0.005 grams, EMC was calculated ((initial weight−equilibrated weight)/equilibrated weight×100). Average EMC was calculated for each level of steepwater within each temperature and relative humidity.

Equilibrated moisture content of pellets containing 10, 15, 20, and 25% CSL (DM basis) at 10 and 30 degrees C. are shown in FIGS. 2 and 3, respectively. Hygroscopicity is the tendency of a product to absorb or take-up moisture from ambient air. Consequently, hygroscopicity is largely influenced by surrounding environmental conditions, e.g., relative humidity. Determining the EMC of feedstuffs allows feed distributors to approximate the amount of moisture a given feed might absorb when exposed to different environmental conditions during storage and/or transport. When feeds are highly hygroscopic, the feeds become more susceptible to potentially adverse effects of mold growth development.

Throughout the EMC determinations, visual observations were made to detect appearance of mold formation on pellet surfaces. Mold was particularly evident on pellets stored at higher temperatures and RH. Pellets (independent of CSL inclusion level) stored at 30 degrees C. and with RH>77% molded 15 d after initiation of the study and were not included in the EMC calculations. Data from Lamond and Graham (1993) reported EMC estimations at higher RH (>70%) are more sensitive to error. Pellets stored at 10 degrees C. yielded higher EMC at similar RH and pellet CSL concentrations, when compared to pellets stored at 30 degrees C. Higher CSL inclusions resulted in higher EMC as RH increased, thereby suggesting the hygroscopicity of CSL is relatively high.

The buffering capacity (BC) of raw soybean hull-steepwater mash was evaluated in vitro. The in vitro acid buffering capacity of alfalfa hay, corn, RSH and SHSL were measured in triplicate by the method of Jasaitis et al. (1987).

In vitro acid BC data for alfalfa, corn, SHSL, and RSH are presented in Table 10. Acid BC values express the amount of acid required to produce a one-unit change in pH. The acid BC values for alfalfa hay and RSH were similar to those reported by Jasaitis et al. (1987), and the acid BC of SHSL was similar to that of alfalfa hay. Jasaitis et al. (1987) found BC of high-protein feedstuffs (>35% CP) to be greater than feeds containing 15 to 35% CP or feeds classified as "energy sources." The crude protein content of the alfalfa hay and SHSL were 20.9 and 25.6%, respectively. Wohlt et al. (1987) noted that protein content influences BC and concluded that the numerical BC values of feedstuffs are not useful, because the slope of the titration curves differed among different types of feeds. Hence, an in vivo study was conducted to verify the in vitro results.

TABLE 10

In vitro buffering capacity of alfalfa hay, corn, raw soybean hulls, and a pellet containing 75% raw soybean hulls, 25% corn steep liquor (DM basis; SHSL).

| Ingredient | n | Initial pH | 0.1N HCl, ml[1] | Acid buffering capacity[2] |
| --- | --- | --- | --- | --- |
| Alfalfa hay | 3 | 5.79 | 3.93 | 0.15 |
| Corn | 3 | 6.10 | 0.70 | 0.03 |
| Raw soybean hulls | 3 | 4.62 | 1.20 | 0.19 |
| SHSL | 3 | 6.16 | 1.60 | 0.07 |
| SEM | | 0.187 | 0.236 | 0.019 |

[1]ml 0.1N HCl required to lower sample pH to 4.
[2]Millimoles acid per unit change in pH, calculated as (ml HCl × 0.1N HCl)/(initial pH −4).

Four ruminally cannulated (10 centimeter internal diameter, Bar Diamond), multiparous Holstein cows (690 kg; 21 kg/d milk) were used to assess the buffering capacity of SHSL in vivo. All cows were administered recombinant bST (Posilac, Monsanto, St. Louis, Mo.) at 14-d intervals of the trial. Periods were 15 d (10 d adaptation, 2 d for pre-challenge measures, and 3 d for subacute ruminal acidosis challenge; SARA) and separated by 10 d to eliminate carry-over effects. During the first 6 d of the 10 d adaptation phase, TMR and ort samples were collected daily and dried at 105 degrees C. to determine daily intake as a percent of body weight.

TABLE 11

Ingredient and nutrient composition of diets fed during the subacute ruminal acidosis challenge experiment.

| | Diet | | | |
| --- | --- | --- | --- | --- |
| | Control | | SHSL[1] | |
| Item | Pre-challenge | Challenge | Pre-challenge | Challenge |
| | % Dry Matter | | | |
| Ingredient | | | | |
| Alfalfa hay | 30.0 | 22.5 | 23.7 | 17.7 |
| Corn silage | 15.0 | 11.2 | 11.2 | 8.4 |
| Whole cottonseed | 9.3 | 6.9 | 9.3 | 6.9 |
| Corn grain, ground | 34.0 | 50.5 | 27.5 | 45.5 |
| Soybean meal, 48% CP | 5.0 | 3.7 | — | — |
| Expeller soybean meal | — | — | 1.7 | 1.2 |
| SHSL pellet | — | — | 20.0 | 15.0 |
| Wet molasses | 1.00 | 0.75 | 1.00 | 0.75 |
| Fish meal | 2.00 | 1.50 | 2.00 | 1.50 |
| Blood meal | 0.50 | 0.38 | 0.50 | 0.38 |
| Dicalcium phosphate | 0.43 | 0.32 | 0.15 | 0.11 |
| Limestone | 1.40 | 1.05 | 1.61 | 1.21 |
| Sodium bicarbonate | 0.67 | 0.50 | 0.67 | 0.50 |
| Magnesium oxide | 0.210 | 0.158 | 0.210 | 0.158 |
| Trace mineralized salt[2] | 0.320 | 0.240 | 0.320 | 0.240 |

TABLE 11-continued

Ingredient and nutrient composition of diets fed during the subacute ruminal acidosis challenge experiment.

| | Diet | | | |
|---|---|---|---|---|
| | Control | | SHSL[1] | |
| Item | Pre-challenge | Challenge | Pre-challenge | Challenge |
| | % Dry Matter | | | |
| Vitamin ADE premix[3] | 0.128 | 0.097 | 0.128 | 0.097 |
| Sodium selenite[4] | 0.014 | 0.011 | 0.014 | 0.011 |
| Nutrient | | | | |
| CP, % | 16.6 | 15.0 | 16.2 | 14.1 |
| RUP, % of CP | 44.2 | 47.5 | 50.6 | 53.6 |
| NEL, Mcal/kg | 1.78 | 1.84 | 1.72 | 1.80 |
| Fat, % | 5.95 | 5.17 | 5.13 | 4.38 |
| NDF, % | 26.8 | 22.0 | 27.4 | 22.1 |
| ADF, % | 19.1 | 15.0 | 20.5 | 16.0 |
| NFC, %[5] | 44.0 | 52.1 | 44.5 | 53.7 |
| Ash, % | 6.62 | 5.72 | 6.73 | 5.74 |
| Ca, % | 1.10 | 0.91 | 0.68 | 0.58 |
| P, % | 0.48 | 0.44 | 0.45 | 0.39 |

[1]Pellet containing 75% raw soybean hulls, 25% corn steep liquor (DM basis).
[2]Composition: not less than 95.5% NaCl, 0.24% Mn, 0.24% Fe, 0.05% Mg, 0.032% Cu, 0.032% Zn, 0.007% I, 0.004% Co.
[3]Contributed 5733 IU vitamin A, 2866 IU vitamin D, 17 IU vitamin E per kg diet DM.
[4]Contained 600 mg Se per kg premix.
[5]NFC = 100 − (% NDF + % CP + % Fat + % Ash).

As depicted in Table 11, dietary treatments were control and SHSL (20% of diet dry matter). Concentrations of the NEL, crude protein, ADF, and NDF were formulated to be similar between diets by replacing portions of alfalfa hay, corn silage, ground corn, and solvent soybean meal with SHSL. To maintain similar RUP levels, expeller soybean meal was substituted into the SHSL diet at the expense of solvent soybean meal. Levels of menhaden fish meal and blood meal were similar between treatments.

Diets were mixed daily at 0530 (all phases) and 1630 h (d 1 through 7). During d 7 to 12, cows were fed once daily at a common DMI as a percent of body weight (2.85%) dictated by the cow consuming the least during the first 6 d of adaptation. Cows were fasted 12 h prior to the first SARA challenge. For each SARA challenge (d 13, 14, and 15), cows were offered 75% of their daily diet at 0600 h. The remaining 25% of diet DM was replaced by ground corn mixed with oats remaining 2 h after feeding and placed into the rumen at that time.

Dietary components (alfalfa hay, corn silage, whole cottonseed, concentrate, and SHSL) were collected on d 10 of each period and frozen (−20 degrees C.), composited across periods at the end of the trial, and analyzed. Crude protein was measured as Kjeldahl N×6.25. *Streptomyces griseus* enzymatic technique was used to measure protein degradability using the method of Roe and Sniffen (1990) for concentrates and the method of Coblentz et al. (1999) for forages. In addition, NDF, ADF, and lignin were measured using the ANKOM A200 (ANKOM Technology Corp., Fairport, N.Y.) filter bag technique. The non-fiber carbohydrate fraction (NFC) was calculated by difference (NRC, 2001). Net energy of lactation (NEL) for forages was calculated using the equation of Van Soest and Fox (1992), whereas concentrate values were calculated according to NRC (1988).

Approximately 500 ml of rumen fluid was collected before and 3, 6, 9, and 12 h after feeding during d 11–15 and strained through four layers of cheesecloth. pH measurements were conducted immediately with a portable pH meter equipped with a combination electrode. Following pH determination, an 8-milliliter sample of filtered fluid was mixed with 2 ml, 25% (wt/vol) metaphosphoric acid and frozen at −20 degrees C. until analyzed for concentrations of VFA, $NH_3$, and lactic acid. Samples for free amino acid and peptide analysis were handled and measured as described by Wessels et al. (1996), except a Technicon AutoAnalyzer III (Technicon Industrial Method No. 337-7 4T, Technicon Industrial Systems) was used. Samples for $NH_3$, lactate, and VFA determination were thawed and centrifuged (30,000 g, 20 minutes, 4 degrees C.). Ammonia concentrations were measured using the Technicon AutoAnalyzer III and following the general protocol of Broderick and Kang (1980). Concentrations of lactic acid were measured using the procedure of Barker and Summerson (1941). Concentrations of VFA were measured by gas chromatography (Model 5890, Hewlett-Packard, Avondale, Penn.) using nitrogen as a carrier (80 ml/min.) and a flame ionization detector. Column (1.9 m×6.35 mm i.d., Supelco packing #1-1965; GP 10% SP-1200/1% $H_3PO_4$) and detector temperature were maintained at 130 and 225 degrees C., respectively.

Analysis of variance was conducted using the SAS System (1990). Data were analyzed as a split-split-plot design using the MIXED procedure (Littell et al., 1996) with the main plot as replicated 2×2 Latin squares, day of each period as the split-plot, and hour within collection day as the split-split plot. Data collected during both days of the 2-d pre-challenge period were considered equivalent. Whereas, each of the three challenge days were considered as a separate sampling day. The model included period, diet, d, diet×d, h, diet×h, d×h, and diet×d×h. Cow, cow×period×diet, and cow×period×d were included as random variables, with the latter two terms serving as the main plot error term and the subplot error term, respectively. Effects of the days were separated using contrasts for 1) pre- vs. post-challenge, 2) linear effects of days within the challenge days, and 3) quadratic effects of days within the challenge days. Effects of hours were separated using contrasts for linear, quadratic, cubic, and quartic responses. Interactions were separated into single degree of freedom contrasts using the interactions of the previously listed contrasts.

The results of the in vitro acid BC of SHSL were supported by the in vivo data. Content and nutrient composition of experimental diets are shown in Table 11. Replacing 25% of diet DM with ground corn during the SARA challenges resulted in an energy dense, highly fermentable diet, and led to an accumulation of rumen volatile fatty acids (VFA). During the SARA challenges, diet NFC increased by 7.7% and 9.1%. Diet NDF from forage decreased by 5.8% and 3.7% for cows fed control and SHSL, respectively. Dry matter intake (as percent of BW) averaged 3.3% during the first 6 d of the adaptation phase. Independent of dietary treatment, milk yields decreased similarly during the induced SARA challenges (FIG. 4). Effect of SARA challenges on ruminal pH is shown in FIG. 5. As expected, ruminal pH declined linearly with time after feeding. But this decrease was greater during the SARA challenges (P<0.1). The lowest ruminal pH (4.9) was recorded from a cow consuming the control diet during the third SARA challenge. Nagaraja et al. (1998) indicated that SARA is present when ruminal pH values are between 5.0 and 5.5. Considering ruminal pH values were falling within this range during the second and third challenges of the present study, the model used to induce SARA was effective.

Concentrations of total ruminal VFA increased linearly (P<0.01) after feeding. Moreover, increases in total ruminal VFA were, on average, 30% greater on challenge days, relative to d 11 and 12 (FIG. 6). During the SARA challenges, linear and quadratic responses (P<0.05) were observed for ruminal acetate and butyrate concentrations (FIGS. 7 and 9, respectively). Similar to the in vitro work of Erfle et al. (1982), the linear decrease in ruminal pH prompted a linear increase in propionate concentrations (FIG. 8) during SARA challenges, thus, resulting in a linear decrease in the acetate:propionate ratio (FIG. 10). These results are similar to those of Goad et al. (1998) who introduced SARA in steers, which were first adapted to an 80% grain-based diet. Nagaraja et al. (1998) indicated that increases in total VFA concentrations are often observed in animals experiencing SARA. Branched-chain VFA concentrations were reduced (P<0.01) with SARA challenges and at a faster rate after feeding on challenge days (FIG. 11). Branched-chain VFA are primarily derived from degraded feed protein or endogenous branched-chain amino acids (Allison and Bryant, 1963). Others (Erfle et al., 1982) reported decreases in branched-chain fatty acid concentrations when pH was lowered (from 6.5 to 5.5 in a continuous culture system). These studies attributed the observed changes to shifts in microbial populations, which likely occurred in the present study.

Concentrations of ruminal lactate were undetectable prior to the SARA challenges and increased linearly (P<0.05) with repeated SARA challenges (FIG. 12). Average ruminal lactic acid concentrations were 3.1, 4.3, and 9.84 at d 13, 14, and 15, respectively. Reductions in ruminal pH led to a rumen microbial shift from lactic acid fermenters to lactic acid producers (Goad et al., 1998). Slight increases, usually <10 mM, in lactic acid have been noted during induced SARA experiments (Goad et al., 1998; Harmon et al., 1985). Horn et al. (1979) indicated that increases in ruminal VFA concentrations depressed ruminal pH during SARA more so than did the accumulation of lactic acid.

During the 2-d pre-challenge collection phase, ruminal $NH_3$ concentrations (FIG. 13) peaked 3 h after feeding, suggesting that protein degradation and fermentation exceeded the rate of carbohydrate fermentation. But within 6 to 9 h after feeding, $NH_3$ concentrations rapidly declined, indicating carbohydrate and protein fermentation was more closely aligned and $NH_3$ utilization was exceeding production. Although the diets contained similar levels of protein (16%), cows fed SHSL tended (P=0.07) to maintain higher ruminal $NH_3$ concentrations (8.2 vs. 11.5 mM for control and SHSL, respectively) throughout the trial. The protein of CSL is highly degradable by ruminal microorganisms both in vitro (Filho, 1999) and in vivo (Patterson et al., 2000). Contradictory to Erfle et al. (1982) and Lana et al. (1998), $NH_3$ concentrations were not influenced by reduced ruminal pH. However, the present CP was lower for challenge, then for pre-challenge diets, despite changes in ruminal pH. Excessive carbohydrate fermentation would generate a surplus of energy and carbon skeletons, thereby increasing the uptake of free $NH_3$ during the production of microbial cell protein. Furthermore, Goad et al. (1999) demonstrated that increases in ruminal acidity lead to partial defaunation, which could reduce ruminal $NH_3$ concentrations as well (Veira, 1986). A review by Owens et al. (1998) indicated highly degradable protein sources, such as CSL, avert depressions in ruminal pH by increasing concentrations in alkaline $NH_3$. Therefore, perhaps the higher $NH_3$ concentrations observed in cows consuming SHSL contributed to the ability of the cows to cope with the induced SARA.

Inducing SARA resulted in higher (P<0.01) concentrations of ruminal peptide N and total ruminal amino acids (FIGS. 14 and 15, respectively). Concentrations of peptide N and total ruminal amino acids were highest 3 h after feeding during the entire trial, but both were approximately two-fold greater during SARA challenges, likely resulting from the force-feeding used to induce SARA. Concentrations of ruminal peptide N, $NH_3$, and total amino acids decreased at a similar rate during the 12 h after feeding. This result contradicts those of Chen et al. (1987), wherein the disappearance of ruminal peptide N was found to be greater than that of both $NH_3$ and soluble protein. Erfle et al. (1982) found reducing ruminal pH from 7 to 5 resulted in an 88% reduction in bacterial protease activity, which subsequently reduced concentrations of $NH_3$, total amino acids, and deaminative activity.

With the exception of a tendency for cows fed SHSL to maintain higher ruminal $NH_3$ concentrations, there were no differences due to SHSL inclusion for the measured ruminal parameters. The lowered ruminal pH and elevated concentrations of VFA and lactate suggested the model used to induce SARA was successful and the partial replacement of alfalfa, corn silage, corn, and soybean meal (SBM) by SHSL did not influence the response to SARA challenges.

Acceptability Trial. Forty multiparous Holstein cows (averaging 255+/−135 DIM and 28+/−6 kg/d milk) were used in a randomized block design to determine the optimal conclusion level of SHSL. The cows were blocked according to pretreatment energy corrected milk )ECM) ((0.327× milk yield)+(12.95×fat yield)+(7.2×protein yield)) production, BW, and BCS (Wildman et al., 1982) and randomly assigned within blocks to one of five diets: 0, 10, 20, 30, or 40% SHSL (DM basis). Diets were formulated to be isonitrogenous and RUP was equalized among diets using expeller soybean meal (Soy Best, Grain States Soya). SHSL incrementally replaced up to 12.5% alfalfa hay, 7.1% corn silage, 12.7% ground shelled corn, and 7.2% expeller soybean meal. Cows were fed the experimental diets for 11 days.

Diets were mixed and offered twice daily for ad libitum consumption as a TMR at 0600 and 1700 h. Orts were removed and weighed once daily and TMR offered was adjusted to insure 10% feed refusal. TMR and ort samples were collected every 3 d and dried at 105 degrees C. to determine DM. Each diet was analyzed for TMR particle size distribution on five consecutive d using the method of Lammers et al. (1996). Dietary components (alfalfa hay, corn silage, whole cottonseed, concentrate, and SHSL, were collected every 3 d, composited at the end of the trial, and analyzed as discussed for the SARA challenge experiment.

Cows were milked twice daily at 0530 and 1630 h and milk yield was recorded. Milk samples (a.m., p.m. composite) were obtained prior to initiation of treatment and at the end of the trial and were analyzed for protein, fat, lactose, solids-not-fat (SNF), milk urea N, and SCC. Milk protein, fat, and lactose were determined using near infrared spectroscopy (Bentley 2000 Infrared Milk Analyzer, Bentley Instruments, Chaska, Minn.). Concentration of milk urea N was determined using chemical methodology based on a modified Berthelot reaction (ChemSpec 150 Analyzer, Bentley Instruments) and somatic cells were counted using a flow cytometer laser (Somacount 500, Bentley Instruments).

Blood (approximately 15 ml) was collected on d 11 (3 h after feeding) from the coccygeal and jugular veins into vacutainers (Becton Dickinson and Co., Franklin Lakes, N.J.) containing EDTA and sodium heparin, respectively, and immediately placed on ice for transport to the laboratory. Blood samples collected from the coccygeal vein were centrifuged, plasma was harvested therefrom and stored at −20 degrees C. until further analysis. Blood samples collected from the jugular vein were analyzed for concentrations of individual amino acids following the procedures outlined by Campbell et al. (1997). Urine and fecal samples were collected on d 11 of the trial and immediately analyzed for pH.

Coccygeal plasma samples were thawed and concentrations of glucose, urea N, and total alpha-amino acid N were measured using a Technicon AutoAnalyzer III (Technicon Industrial Systems). A peroxidase indicator reaction with glucose oxidase (Technicon industrial method no. SE-4-0036FJ4) was used to determine plasma glucose concentrations. Plasma urea N was measured by a diacetyl-monozime assay (Technicon industrial method no. 339-01) and total alpha-amino N was determined by a trinitrobenzenesulfonic acid assay (Technicon industrial method no. 512-77T).

Data were analyzed as a randomized block design using the MIXED procedure of SAS. The model included block and diet. For DMI, milk yield, and milk composition, the pretreatment values were included as covariates. Contrasts for linear, quadratic, cubic, and quartic effects of SHSL conclusion level were used to separate means.

Ingredient and nutrient composition of the experimental diets are shown in Table 12. The crude protein percent and calculated energy density (Mcal/kg) of experimental diets averaged 17 and 1.66, respectively. The SHSL pellet incrementally replaced up to 12.5% alfalfa hay, 7.1% corn silage, 12.7% ground corn, and 7.2% expeller SBM, which resulted in a linear increase in diet NDF and a decrease in diet NFC. The crude protein and phosphorus (19.6% and 0.6%, DM basis, respectively) content of SHSL allowed solvent SBM and dicalcium phosphate to be gradually reduced with increasing levels of SHSL and entirely removed from the diet at the 40% SHSL inclusion. From the particle size distribution of the TMR, it was apparent that SHSL was retained on the middle sieve (FIG. 16). The top sieve retained approximately 12% of particles from all diets and the percentage of particles retained in the pan decreased linearly as SHSL inclusions increased.

TABLE 12

Ingredient and nutrient composition of experimental diets fed during the Acceptability Trial.

| | SHSL[1], % of DM | | | | |
|---|---|---|---|---|---|
| Item | 0 | 10 | 20 | 30 | 40 |
| Ingredient | | | | | |
| Alfalfa hay | 30.2 | 27.0 | 24.0 | 20.8 | 17.7 |
| Corn silage | 15.2 | 13.6 | 11.7 | 10.0 | 8.1 |
| Whole cottonseed | 9.4 | 9.4 | 9.4 | 9.4 | 9.4 |
| Corn grain, ground | 30.7 | 27.4 | 24.3 | 21.1 | 18.0 |
| Soybean meal, 48% CP | 6.0 | 4.5 | 3.0 | 1.5 | — |
| Expeller soybean meal | 4.0 | 3.7 | 3.4 | 3.2 | 2.8 |
| SHSL | — | 10.0 | 20.0 | 30.0 | 40.0 |
| Wet molasses | 1.0 | 1.0 | 1.0 | 1.0 | 1.0 |
| Dicalcium phosphate | 0.41 | 0.32 | 0.13 | — | — |
| Limestone | 1.70 | 1.68 | 1.63 | 1.59 | 1.57 |
| Sodium bicarbonate | 0.74 | 0.75 | 0.75 | 0.74 | 0.75 |
| Magnesium oxide | 0.20 | 0.20 | 0.21 | 0.22 | 0.21 |
| Trace mineralized salt[2] | 0.32 | 0.32 | 0.31 | 0.32 | 0.32 |

TABLE 12-continued

Ingredient and nutrient composition of experimental diets fed during the Acceptability Trial.

| | SHSL[1], % of DM | | | | |
|---|---|---|---|---|---|
| Item | 0 | 10 | 20 | 30 | 40 |
| Vitamin ADE premix[3] | 0.13 | 0.13 | 0.13 | 0.13 | 0.13 |
| Sodium selenite premix[4] | 0.014 | 0.014 | 0.014 | 0.014 | 0.014 |
| Nutrient | | | | | |
| CP, % | 16.7 | 17.3 | 17.2 | 17.1 | 17.4 |
| RUP, % of CP | 40.2 | 37.4 | 37.2 | 38.4 | 37.9 |
| NEL, Mcal/kg | 1.68 | 1.67 | 1.66 | 1.65 | 1.64 |
| Fat, % | 5.41 | 5.11 | 5.20 | 5.23 | 4.93 |
| NDF, % | 28.6 | 30.3 | 31.8 | 34.4 | 36.0 |
| ADF, % | 20.8 | 22.8 | 24.0 | 26.0 | 27.6 |
| Non-fiber carbohydrate, %[5] | 42.7 | 40.0 | 38.4 | 36.0 | 33.7 |
| Ash, % | 6.58 | 7.27 | 7.40 | 7.29 | 8.01 |
| Ca, % | 0.94 | 0.98 | 0.99 | 0.88 | 1.10 |
| P, % | 0.49 | 0.52 | 0.51 | 0.51 | 0.49 |

[1]Pellet containing 75% raw soybean hull, 25% corn steep liquor (DM basis).
[2]Composition: not less than 95.5% NaCl, 0.24% Mn, 0.24% Fe, 0.05% Mg, 0.0 32% Cu, 0.032% Zn, 0.007% I 0.004% Co.
[3]Contributed 5,733 IU vitamin A, 2866 IU vitamin D, 17 IU vitamin e per kg diet DM.
[4]Contained 600 mg Se per kg premix.
[5]NFC = 100 − (% NDF + % CP + % Fat + % Ash).

Effects of experimental diets on lactational performance and plasma metabolites are presented in Tables 13 and 14, respectively. A quadratic response (P=0.01) was observed for DMI with cows fed 30% SHSL consuming the least. The practice of pelleting concentrates is known to increase consumption (Kertz et al., 1981) and Weidner and Grant (1994) have postulated that SH increases DMI because they reduce dietary particle size. However, DMI observed in the present study are similar to those of Cunningham et al. (1993), with the exception of cows fed 40% SHSL. Cunningham et al. (1993) replaced dietary foliage with SH at 0%, 12%, and 25% of diet DM and observed a decrease (P<0.25) in DMI with increasing levels of SH. A significant cubic effect (P<0.05) was observed for ECM yield and efficiency as cows fed 10%, 20%, or 40% SHSL produced more ECM, more efficiently (ECM/DMI) than cows fed diets containing 0% or 40% SHSL. Percent fat, protein, and SNF and milk were not affected by diet. But the corresponding yields (kg/d) responded cubicly (P<0.01), similar to ECM. Improvements in milk fat and protein yields were attributed to the levels of the alfalfa hay, which were maintained (18% to 30% of diet DM) with the SHSL inclusion levels. The importance of maintaining adequate effective fiber was illustrated by Weidner and Grant (1994), who fed SH at 25% of diet DM with and without 20% alfalfa hay. Weidner and Grant (1994) reported improvements and milk fat and protein yields and dietary DM digestibility when SH were fed with 20% alfalfa hay. Milk and plasma urea N concentrations were highest for cows fed 40% SHSL, most likely due to the insufficient diet NFC (34%). Concentrations of plasma glucose were not affected by dietary treatment, which agrees with MacGregor et al. (1976). MacGregor et al. (1976) used soybean mill run to replace corn at 0%, 27%, and 49% of diet DM. Quadratic responses (P<0.05) were observed for plasma lysine, leucine, tryptophan, tyrosine, total essential amino acids, and total alpha-amino acids, for all higher for intermediate levels of SHSL.

TABLE 13

Lactational performance of cows during the Acceptability Trial.

| Item | SHSL[1], % of DM | | | | | SEM | Contrast | | | |
| --- | --- | --- | --- | --- | --- | --- | --- | --- | --- | --- |
| | 0 | 10 | 20 | 30 | 40 | | Linear | Quadratic | Cubic | Quartic |
| DMI, kg/d | 25.9 | 24.7 | 24.0 | 22.7 | 26.6 | 1.00 | 0.93 | 0.01 | 0.15 | 0.42 |
| Intake, % BW | 3.81 | 3.60 | 3.51 | 3.35 | 3.91 | 0.12 | 0.90 | <0.1 | 0.14 | 0.37 |
| Milk, kg/d | 27.7 | 30.5 | 30.0 | 24.8 | 31.8 | 1.22 | 0.53 | 0.42 | <0.01 | 0.09 |
| ECM, kg/d | 28.9 | 31.8 | 32.0 | 25.7 | 33.2 | 1.22 | 0.57 | 0.54 | <0.01 | 0.02 |
| ECM/DMI | 1.10 | 1.31 | 1.35 | 1.16 | 1.26 | 0.07 | 0.45 | 0.09 | 0.04 | 0.35 |
| Milk fat, % | 3.54 | 3.63 | 3.82 | 3.81 | 3.67 | 0.16 | 0.41 | 0.28 | 0.66 | 0.82 |
| Milk protein, % | 3.53 | 3.52 | 3.56 | 3.53 | 3.37 | 0.06 | 0.16 | 0.14 | 0.35 | 0.96 |
| Lactose, % | 4.85 | 4.80 | 4.82 | 4.81 | 4.85 | 0.05 | 0.99 | 0.41 | 0.87 | 0.74 |
| SNF, % | 9.16 | 9.08 | 9.15 | 9.12 | 8.98 | 0.09 | 0.30 | 20.55 | 0.40 | 0.79 |
| Milk fat, kg/d | 0.97 | 1.09 | 1.13 | 0.88 | 1.18 | 0.05 | 0.18 | 0.69 | <0.01 | 0.03 |
| Lactose, kgd | 1.35 | 1.47 | 1.45 | 1.19 | 1.55 | 0.06 | 0.53 | 0.33 | <0.01 | 0.09 |
| SNF, kgd | 2.52 | 2.76 | 2.73 | 2.25 | 2.87 | 0.11 | 0.63 | 0.47 | <0.01 | 0.08 |
| Milk urea N, mg/dL | 16.2 | 16.8 | 16.7 | 16.1 | 19.0 | 0.47 | <0.01 | 0.02 | 0.01 | 0.31 |
| SCC, ×1000 | 143 | 176 | 271 | 424 | 87 | 88.0 | 0.63 | 0.04 | 0.05 | 0.48 |
| Urine pH | 8.18 | 8.16 | 8.20 | 7.97 | 8.20 | 0.09 | 0.59 | 0.47 | 0.16 | 0.20 |
| Fecal pH | 6.60 | 6.53 | 6.59 | 6.59 | 6.43 | 0.07 | 0.23 | 0.40 | 0.23 | 0.86 |

[1]Pellet containing 75% raw soybean hull, 25% corn steep liquor (DM basis).

TABLE 14

Plasma metabolites during the Acceptability Trial.

| Item | SHSL[1], % of DM | | | | | SEM | Contrast | | | |
| --- | --- | --- | --- | --- | --- | --- | --- | --- | --- | --- |
| | 0 | 10 | 20 | 30 | 40 | | Linear | Quadratic | Cubic | Quartic |
| Essential AA[2], μM | | | | | | | | | | |
| Lys | 76.2 | 91.5 | 94.9 | 99.3 | 81.4 | 6.57 | 0.39 | 0.1 | 0.61 | 0.51 |
| His | 60.9 | 70.5 | 72.6 | 67.2 | 64.7 | 4.39 | 0.75 | 0.06 | 0.45 | 0.77 |
| Arg | 86.5 | 91.3 | 93.1 | 99.8 | 91.1 | 5.30 | 0.30 | 0.27 | 0.45 | 0.53 |
| Thr | 85.8 | 93.4 | 96.2 | 93.5 | 90.6 | 6.01 | 0.62 | 0.25 | 0.80 | 0.90 |
| Val | 309 | 373 | 337 | 355 | 327 | 24.0 | 0.82 | 0.15 | 0.48 | 0.21 |
| Met | 21.1 | 23.5 | 35.1 | 24.0 | 24.4 | 3.56 | 0.53 | 0.05 | 0.83 | 0.03 |
| Ile | 138 | 166 | 155 | 172 | 150 | 9.4 | 0.32 | 0.05 | 0.95 | 0.09 |
| Leu | 180 | 210 | 204 | 212 | 188 | 11.7 | 0.64 | 0.04 | 0.91 | 0.32 |
| Phe | 47.1 | 51.0 | 53.2 | 54.4 | 49.6 | 2.54 | 0.31 | 0.06 | 0.58 | 0.79 |
| Trp | 36.9 | 42.3 | 41.9 | 42.0 | 39.6 | 1.93 | 0.42 | 0.04 | 0.60 | 0.57 |
| Total | 1043 | 1215 | 1184 | 1221 | 1108 | 59 | 0.48 | 0.03 | 0.77 | 0.34 |
| Non-essential AA[2], μM | | | | | | | | | | |
| Asp | 12.5 | 12.9 | 13.3 | 13.3 | 12.9 | 0.43 | 0.37 | 0.22 | 0.75 | 0.88 |
| Ser | 70.8 | 78.6 | 76.2 | 71.8 | 72.1 | 2.95 | 0.65 | 0.13 | 0.11 | 0.94 |
| Glu | 74.7 | 70.0 | 69.8 | 76.7 | 74.4 | 3.90 | 0.63 | 0.43 | 0.26 | 0.56 |
| Gly | 244 | 251 | 229 | 216 | 236 | 11.5 | 0.18 | 0.43 | 0.09 | 0.90 |
| Ala | 192 | 228 | 233 | 225 | 216 | 13.2 | 0.29 | 0.04 | 0.48 | 0.95 |
| Asn | 62.4 | 77.2 | 76.8 | 77.8 | 73.3 | 4.11 | 0.10 | 0.02 | 0.45 | 0.49 |
| Gln | 85.6 | 90.3 | 84.0 | 82.8 | 90.6 | 3.91 | 0.84 | 0.45 | 0.11 | 0.71 |
| Tyr | 53.4 | 65.3 | 66.8 | 68.7 | 62.1 | 3.70 | 0.09 | 0.01 | 0.88 | 0.53 |
| Total | 796 | 874 | 850 | 833 | 838 | 27 | 0.62 | 0.18 | 0.15 | 0.68 |
| Total α-amino acids, μM | 1839 | 2089 | 2035 | 2054 | 1947 | 73 | 0.45 | 0.02 | 0.45 | 0.35 |
| Urea N, mg/dl | 17.8 | 19.9 | 16.8 | 16.5 | 19.5 | 0.92 | 0.99 | 0.20 | 0.008 | 0.40 |
| Total α-amino N, mM | 2.78 | 2.75 | 2.62 | 2.62 | 2.78 | 0.10 | 0.70 | 0.18 | 0.42 | 0.83 |
| Glucose, mg/dl | 66.1 | 65.6 | 67.2 | 67.5 | 65.1 | 1.12 | 0.95 | 0.27 | 0.19 | 0.87 |

[1]Pellet containing 75% raw soybean hull, 25% corn steep liquor (DM basis).
[2]AA = amino acids.

These data indicate SHSL, up to 40% of diet DM, is an acceptable feedstuff for lactating dairy cows during short term feeding periods. Based on efficiency of ECM production and the basic practicalities of dairy cattle nutrition, one concludes that both cow health and performance were optimized when SHSL was fed at 20% of diet DM.

Eighteen multiparous Holstein cows (averaging 148+/−35 DIM and 41.5 kg/d ECM) were used in six replicated 3×3 Latin squares with 28-d periods. Treatments were control, SHSL (20% of diet DM), or pelleted raw soybean hulls (RSH) (PSH, 15% of diet DM). The PSH diet was formulated to provide RSH at a level equal to the RSH contained in the SHSL diet. All cows were injected with recombinant bST (Posilac, Monsanto Co.) at 14-d intervals throughout the study. Diets were formulated to meet NRC (1989) guidelines for 40 kg per day milk production. Diets were formulated to be isonitrogenous with similar amounts of NDF, ADF, and RUP. All diets contained similar levels of menhaden fish meal and blood meal and expeller SBM replaced a portion of the solvent SBM in the SHSL diet to equalize diet RUP.

Pretreatment ECM and BW were used to assign cows to squares. All possible dietary treatment sequences were represented equally within the experimental design. All diets were mixed and offered as a TMR for ad libitum consumption twice daily. Orts were removed and weighed daily prior to the p.m. feeding. TMR offered was adjusted to insure 10% feed refusal. TMR, orts, and corn silage samples were collected weekly and dried at 105 degrees C. for DM determination. Samples of alfalfa hay, corn silage, SHSL, and PSH were collected weekly and composited by period. Fish meal and blood meal were sampled at the beginning of the trial and cottonseed was sampled by load. Grade mixes were sampled by batch and composited by period. All samples were subjected to analysis as described for the SARA challenge experiment.

Cows were milked twice daily at 0530 and 1630 h and milk yield was recorded. Milk samples (a.m., p.m. composite) were obtained weekly and analyzed for protein, fat, lactose, SNF, milk urea N (MUN), and SCC as specified for the acceptability experiment. Milk was also collected, immediately placed on ice at the end of each period, and analyzed for milk nitrogen distribution (Rowland, 1938). Cows were weighed immediately after the p.m. milking on two consecutive days at the beginning of the study and the end of each period. Averages of the two weights were used for analysis. Body condition was scored according to Wildman et al. (1982) at the beginning of the study and the end of each period. Rectal temperatures were recorded at 3 h after feeding on d 6 and 7 of each week using a digital thermometer. Weekly blood samples (approximately 15 ml) were collected into vacutainers (Becton Dickinson) containing EDTA 3 h after feeding from the coccygeal vein and immediately placed on ice. Plasma was separated and stored at −20 degrees C. until analyzed for glucose, urea N, and total alpha-amino N using the procedures described during the acceptability experiment. Plasma non-esterified fatty acid (NEFA) concentrations were measured using a colorimetric assay (NEFA-C Kit, Wako Chemicals, Richmond, Va.) as modified by Eisemann et al. (1988). A colorimetric assay (Infinity Triglycerides Reagent procedure no. 343; Sigma Diagnostics, St. Louis, Mo.) was used to determine concentration of plasma triacylglycerides. At the end of each 28-d., blood was collected from the jugular vein into vacutainers containing sodium heparin. Plasma was harvested and concentrations of individual amino acids were measured as described for the acceptability experiment. Urine and fecal samples were collected on d 6 of each week and immediately analyzed for pH.

Analysis of variance was performed using the MIXED procedure of SAS. An individual cow was the experimental unit. Data collected daily (milk production and DMI) and weekly (milk composition, plasma metabolites, rectal temperature) were analyzed as split plots, with the main plots as Latin squares and week as the subplot. The model included cow, period, treatment, week, and the week× treatment interaction, and animal×period×treatment were included as a random variable to serve as the main plot error term. Data collected once per period (BW and BCS change, plasma amino acid profile, milk N distribution) were analyzed using the MIXED procedure of SAS with cow, period, and treatment in the model. Treatment means were separated using the PDIFF option for all comparisons among means when the F-test for treatment was significant (P<0.05).

Ingredient and chemical composition of experimental diets are shown in Table 15. Diet CP concentration (%) and calculated energy density (Mcal/kg NEL) were 16.6 and 1.78, 16.3 and 1.73, and 17.1 and 1.71 for C, SHSL, and PSH, respectively. A higher than expected crude protein content of the formulated grain mix likely resulted in the higher crude protein content of PSH. The differences between formulated and analyzed RDP content of the diets resulted from lower than expected RDP content of SHSL. Diet forage NDF was 18.1%, 13.8%, and 14.0% for C, SHSL, and PSH, respectively.

TABLE 15

Ingredient and nutrient composition of experimental diets fed during the Performance Trial.

| Item | Diet | | |
|---|---|---|---|
| | Control | SHSL[1] | PSH[2] |
| | % Dry Matter | | |
| Ingredient | | | |
| Alfalfa hay | 29.7 | 23.8 | 24.3 |
| Corn silage | 16.0 | 11.0 | 11.2 |
| Whole cottonseed | 9.3 | 9.1 | 9.3 |
| Corn grain, ground | 33.5 | 27.2 | 29.2 |
| Soybean meal, 48% CP | 5.0 | — | 5.1 |
| Expeller soybean meal | — | 1.7 | — |
| SHSL[1] | — | 20.7 | — |
| Soybean hulls, pellet | — | — | 14.3 |
| Wet molasses | 1.0 | 1.0 | 1.0 |
| Fish meal | 1.9 | 1.9 | 2.0 |
| Blood meal | 0.50 | 0.49 | 0.50 |
| Dicalcium phosphate | 0.42 | 0.15 | 0.50 |
| Limestone | 1.38 | 1.59 | 1.31 |
| Sodium bicarbonate | 0.66 | 0.66 | 0.67 |
| Magnesium oxide | 0.21 | 0.21 | 0.21 |
| Trace mineralized salt[3] | 0.32 | 0.32 | 0.32 |
| Vitamin ADE premix[4] | 0.13 | 0.13 | 0.13 |
| Sodium selenite premix[5] | 0.013 | 0.014 | 0.014 |
| Nutrient | | | |
| CP, % | 16.6 | 16.3 | 17.1 |
| RUP, % of CP | 44.1 | 50.3 | 45.1 |
| NEL, Mcal/kg[3] | 1.78 | 1.73 | 1.71 |
| Fat, % | 5.92 | 5.07 | 5.72 |
| NDF, % | 26.9 | 27.5 | 31.6 |
| ADF, % | 19.1 | 20.6 | 23.1 |
| NFC, %[6] | 44.0 | 44.4 | 37.7 |
| Ash, % | 6.61 | 6.74 | 7.86 |
| Ca, % | 1.10 | 0.68 | 0.96 |
| P, % | 0.47 | 0.45 | 0.52 |

[1]Pellet containing 75% raw soybean hull, 25% corn steep liquor (DM basis).
[2]Pelleted raw soybean hulls.
[3]10 composition: not less than 95.5% NaCl, 0.24% Mn, 0.24% Fe, 0.5% Mg, 0.032% Cu, 0.032% Zn, 0.007% I, 0.004% Co.
[4]Contributed numeral 5,733 IU vitamin A, 2,866 IU vitamin D, 17 IU vitamin E per kilo golf diet DM.
[5]Contained 600 mg Se per kg premix.
[6]NFC = 100 minus (% NDF + % CP + % Fat + % Ash).

Effects of experimental diets on lactational performance and plasma metabolites are presented in Tables 16 and 17, respectively. Observations from one cow were omitted due to reasons not related to dietary treatment. Dry matter intakes of cows fed SHSL were similar to C and PSH. However, cows fed PSH consumed more (P<0.5) DM than cows fed C. Weidner and Grant (1994) reported a 14% improvement and DMI when soybean hulls were fed with coarsely chopped hay. Cows fed SHSL or PSH produced more milk and ECM (P<0.05) than cows fed C. However, production efficiencies (ECM/DMI) were similar among treatment groups.

TABLE 16

Lactational performance of cows during the Performance Trial.

| | Diets | | | |
|---|---|---|---|---|
| Item | Control | SHSL[1] | PSH[2] | SEM |
| DMI, kg/d | 26.0[b] | 26.7[ab] | 27.3[a] | 0.33 |
| Milk, kg/d | 33.9[b] | 36.3[a] | 36.6[a] | 0.55 |
| ECM[3] kg/d | 36.5[b] | 38.4[a] | 38.3[a] | 0.62 |
| ECM/DMI | 1.33 | 1.39 | 1.35 | 0.02 |
| Milk fat, % | 4.11[a] | 3.93[b] | 3.89[b] | 0.056 |
| Milk CP, % | 3.12 | 3.14 | 3.13 | 0.019 |
| Milk SNF, % | 8.65[b] | 8.78[a] | 8.78[a] | 0.025 |
| Milk lactose, % | 4.64[b] | 4.75[a] | 4.75[a] | 0.028 |
| Milk fat, kg/d | 1.38 | 1.42 | 1.40 | 0.028 |
| Milk CP, kg/d | 1.05[b] | 1.13[a] | 1.14[a] | 0.017 |
| Milk SNF, kg/d | 2.94[b] | 3.18[a] | 3.22[a] | 0.049 |
| Milk lactose, kg/d | 1.59[b] | 1.72[a] | 1.75[a] | 0.029 |
| SCC, ×1000 | 221[a] | 128[b] | 129[b] | 31 |
| Milk urea N, mg/dl | 15.2[b] | 16.8[a] | 16.4[a] | 0.25 |
| CP efficiency[4] | 24.8[b] | 26.3[a] | 24.5[b] | 0.31 |
| Initial BW, kg | 664 | 669 | 668 | 4.8 |
| Final BW, kg | 661 | 657 | 651 | 4.9 |
| Initial BCS | 2.64 | 2.69 | 2.65 | 0.04 |
| Final BCS | 2.68 | 2.66 | 2.65 | 0.04 |
| Urine pH | 8.32[ab] | 8.30[b] | 8.33[a] | 0.01 |
| Fecal pH | 6.49[c] | 6.65[a] | 6.58[b] | 0.03 |
| Rectal temp., °C. | 101.6 | 101.8 | 11.7 | 0.09 |

[1]Pellet containing 75% raw soybean hull, 25% corn steep liquor (DM basis).
[2]Pelleted raw soybean hulls.
[3]Energy corrected milk.
[4]CP output in milk (kg/d)/calculated dietary cp FAT intake (kg/d).
[a,b]Means not bearing common superscript differ (P < 0.05).

TABLE 17

Plasma metabolites during the Performance Trial.

| | Diet | | | |
|---|---|---|---|---|
| Item | Control | SHSL[1] | PSH[2] | SEM |
| Essential amino Acids, μM | | | | |
| Lysine | 85.0 | 89.3 | 80.8 | 3.60 |
| Histidine | 65.0[ab] | 67.3[a] | 61.0[b] | 1.76 |
| Arginine | 87.0 | 87.4 | 81.5 | 2.97 |
| Threonine | 91.5 | 90.2 | 90.1 | 4.86 |
| Valine | 288 | 308 | 282 | 10.0 |
| Methionine | 24.8 | 23.8 | 22.8 | 0.92 |
| Isoleucine | 142 | 149 | 134 | 5.2 |
| Leucine | 186 | 185 | 170 | 6.9 |
| Phenylalanine | 58.1 | 55.5 | 53.0 | 1.89 |
| Tryptophan | 39.6 | 41.4 | 41.2 | 1.11 |
| Total | 1068 | 1099 | 1018 | 34 |
| non-essential Amino Acids, μM | | | | |
| Aspartic acid | 9.7 | 10.6 | 10.5 | 0.45 |
| Serine | 69.8 | 71.7 | 68.0 | 2.73 |
| Glutamic acid | 55.4 | 53.3 | 50.8 | 1.56 |
| Glycine | 197 | 207 | 209 | 6.5 |
| Alanine | 240 | 237 | 240 | 7.6 |
| Asparagine | 39.3 | 41.1 | 37.4 | 1.98 |
| Glutamine | 230 | 231 | 216 | 7.9 |
| Tyrosine | 61.8[a] | 57.7[ab] | 52.8[b] | 2.6 |
| Total | 902 | 911 | 886 | 26 |
| Total α-amino acids, μM | 1971 | 2011 | 1904 | 55 |
| Urea N, mg/dl | 16.1[b] | 17.3[a] | 17.2[a] | 0.27 |
| Total α-amino N, mM | 2.30[b] | 2.47[a] | 2.53[a] | 0.032 |
| Glucose, mg/dl | 71.8 | 72.0 | 71.9 | 0.36 |
| Triacylglycerol, mg/dl | 12.0 | 12.6 | 12.2 | 0.26 |
| NEFA, mM | 105.0 | 106.1 | 92.6 | 7.85 |

[1]Pellet containing 75% raw soybean hull, 25% corn steep liquor (DM basis).
[2]Pelleted raw soybean hulls.
[a,b]Means not bearing common superscript differ (P < 0.05).

In this study, milk protein percent was not affected by diet. However, feeding SHSL and PSH increased (P<0.05) milk protein yield. The ratio of crude protein output in milk to calculated CP intake was highest (P<0.05) for cows fed SHSL and similar for those fed PSH and C. Calculated CP intakes were 4.3, 4.3, and 4.6 kg/d for C, SHSL, and PSH, respectively. Because milk protein yield, MUN, plasma urea N, and total alpha-amino N were similar for SHSL and PSH, Differences in protein efficiencies were due to differences in dietary CP concentrations, which were lowest for cows fed SHSL. Treatment effects on milk N distribution were not detected (Table 18). Milk fat percent and SCC were similar for cows fed SHSL and PSH, but were higher (P<0.05) for those fed C. The importance of using adequate effective fiber to maintain ruminal pH and optimal milk fat production has been outlined by Allen (1997). Generally, milk fat production has not been affected when soybean hulls are substituted for portions of concentrates (Bernard and McNeill, 1991; Nakamura and Owen, 1989) or forages (Cunningham et al., 1993).

TABLE 18

Effect of diet on milk N distribution during the Performance Trial.

| | Diet | | | |
|---|---|---|---|---|
| Item | Control | SHSL[1] | PSH[2] | SEM |
| Total N, % | 0.534 | 0.533 | 0.532 | 0.0004 |
| Protein N | | | | |
| % | 0.516 | 0.515 | 0.511 | 0.005 |
| % of total N | 96.7 | 96.6 | 96.5 | 0.08 |
| Casein N | | | | |
| % | 0.47 | 0.47 | 0.47 | 0.004 |
| % of total N | 87.7 | 88.0 | 87.6 | 0.24 |
| % of protein N | 90.8 | 91.1 | 90.8 | 0.28 |
| Whey N | | | | |
| % | 0.049 | 0.046 | 0.047 | 0.002 |
| % of total N | 8.91 | 8.62 | 8.86 | 0.277 |
| % of protein N | 9.22 | 8.92 | 9.18 | 0.282 |
| NPN | | | | |
| % | 0.018 | 0.018 | 0.019 | 0.00045 |
| % of total N | 3.34 | 3.37 | 3.57 | 0.076 |

[1]Pellet containing 75% raw soybean hull, 25% corn steep liquor (DM basis).
[2]Pelleted raw soybean hulls.

Body weight, body condition, and concentrations of glucose, non-esterified fatty acids, and triacylglycerol in plasma were not influenced by diet. Although cows fed SHSL and PSH had higher (P<0.05) total alpha-amino N in plasma, the sum of individual amino acids as well as concentrations of individual amino acids were similar. No differences were detected among dietary treatments for total essential, total non-essential, and total alpha-amino acids.

CONCLUSION

The animal feeds and methods of the present invention have a number of advantages. The following advantages are not meant to be an exhaustive list of all of the advantages of one or more of the embodiments of the invention. In addition, it should be noted that some embodiments of the invention may not have all or any of the advantages listed below. These advantages, therefore, are meant to be exemplary only, are not intended to be a list of advantages that each and every embodiment of the invention may possess.

One advantage is that the present animal feed utilizes the nutritional advantages inherent in both the liquid byproduct from agricultural processing and the fibrous portion from milling. For instance, in an embodiment of the invention containing steepwater and soybean hulls as components, both of these components may provide certain nutritional advantages. Diets formulated to meet the requirements of high producing dairy cows may be energy dense and may result in clinical or borderline acidosis. While substitution of plant and animal fats for starch has been somewhat effective in reducing acidosis, it can have a negative effect on milk protein content. Sources of digestible fibers, such as soybean hulls, have been used to replace a certain percent, sometimes on the order of 25 percent, of the corn grain in diets for dairy cows. Such diets have had positive effects on the health of the cows without reductions in milk yield or feed intake. The digestible fibers in soybean hulls may tend to reduce rumen acidosis as well. Steepwater may stimulate an animal's appetite and may improve the rate of weight gain or milk production. Steepwater may also improve lactate utilization by rumen microbes resulting in a higher rumen pH, which may be more favorable to rumen fermentation. Steepwater may also contain digestible proteins. which favor microbial activity.

Other advantages of the present animal feed are that the animal feed is cheaper and easier to transport and store and may have a longer shelf life. If the animal feed of the invention is in pellet form, block form, or meal form, and if the animal feed is generally dry, such as 85 percent dry, the shelf life of the animal feed may be longer than the use of an individual component of the feed, because the likelihood of secondary fermentation is greatly diminished. For example, steepwater may be both difficult to store and may further ferment, as explained above. In an embodiment of the invention containing (or made from) steepwater and soybean hulls, the animal feed may be easier to handle (i.e., in a dry pellet, meal, block, or cube form), and the animal feed may have a longer shelf life. In addition, storage and transportation costs may be reduced because special tankers and piping are no longer needed (as may be needed for steepwater). The feed doesn't have to be transported and stored as a liquid, reducing all costs involved.

In an embodiment of the invention containing soybean hulls and steepwater, the animal feed may provide an outlet for increased revenue from these secondary products. For instance, a large amount of steepwater may be produced during corn processing. In addition, approximately 4 lbs. of soybean hulls may be produced for every 60 lb. bushel of soybeans that is processed (soybean meal and soybean oil are the high value products). The animal feed of one embodiment of the invention may therefore provide an outlet for an increased price for soybean hulls and steepwater.

While the present invention has been described with reference to several embodiments thereof, those skilled in the art will recognize various changes that may be made without departing from the spirit and scope of the claimed invention. Accordingly, this invention is not limited to what is shown in the drawings and described in the specification but only as indicated in the appended claims. Any numbering or ordering of elements in the following claims is merely for convenience and is not intended to suggest that the ordering of the elements of the claims has any particular significance other than that otherwise expressed by the language of the claims.

REFERENCES

AACC. 1983. Approved Methods of the American Association of Cereal Chemists Vol. II. St. Paul, Minn.

Allen, M. S. 1997. Relationship between fermentation acid production in the rumen and the requirement for physically effective fiber. J. Dairy Sci. 80:1447–1462.

Allison, M. J. and M. P. Bryant. 1963. Biosynthesis of branched-chain fatty acids by rumen bacteria. Arch. Biochem. Biophys. 101:269–277.

ASAE. 1987. Wafers, pellets, crumbles-definitions and methods for determining density, durability, and moisture content. ASAE Standard S269.3, Agricultural Engineers Yearbook of Standards. P. 318. American Society Agricultural Engineers, St. Joseph, Mich.

Barker, S. B., and W. H. Summerson. 1941. The colorimetric determination of lactic acid in biological material. J. Biol. Chem. 138:535–554.

Bartley, E. E., A. D. Davidovich, G. W. Barr, G. W. Griffel, A. D. Dayton, C. W. Deyoe, and R. M. Bechtle. 1976. Ammonia toxicity in cattle. I. Rumen and blood changes associated with toxicity and treatment methods. J. Anim. Sci. 43:835–841.

Bentley Instruments Inc. 1984. Bentley 2000 Accurate Infrared Analyzer for Dairy Products. The United States of America. Pp 2–3.

Bentley Instruments Inc. 1994. Somacount 500 Operator's Manual. The United States of America. Pp 2–3.

Bentley Instruments Inc. 1998. The Chemspec 150 Users Guide. The United States of America. Pp 4.

Bernard, J. K. and W. W. McNeill. 1991. Effect of high fiber energy supplements on nutrient digestibility and milk production of lactating dairy cows. J. Dairy Sci. 74:991–995.

Briggs, J. L., D. E. Maier, B. A. Watkins, and K. C. Behnke. 1999. Effect of ingredients and processing parameters on pellet quality. Poultry Sci. 78:1464–1471.

Broderick, G. A. and J. H. Kang. 1980. Automated simultaneous determination of ammonia and total amino acids in ruminal fluid and in vitro media. J. Dairy Sci. 63:64–75.

Campbell, C. G., E. C. Titgemeyer, and G. St-Jean. 1997. Sulfur amino acid utilization by growing steers. J. Anim. Sci. 75:230–238.

Chen, G., C. J. Sniffen, and J. B. Russell. 1987. Concentration and estimated flow of peptides from the rumen of dairy cattle: Effects of protein quality, protein solubility and feeding frequency. J. Dairy Sci. 70:983–992.

Coblentz, W. K., I. E. Abjelgadir, R. C. Cochran, J. O. Fritz, W. H. Fick, K. C. Olson, and J. E. Turner. 1999. Degradability of foliage proteins by in situ and in vitro enzymatic methods. J. Dairy Sci. 82:343–354.

Cunningham, K. D., M. J. Cecava, and T. R. Johnson. 1993. Nutrient digestion, nitrogen, and amino acid flows in lactating cows fed soybean hulls in place of forage or concentrate. J. Dairy Sci. 76:3523–3535.

DeFrain, J. M. 2001. Development and evaluation of a pelleted feedstuff containing raw soybean hulls and corn steep liquor for lactating dairy cattle diets. M.S. Thesis, Kansas State University, Manhattan.

Eisemann, J. H., G. B. Huntington, and C. L. Ferrell. 1988. Effects of dietary clenbuterol on metabolism of the hindquarters in steers. J. Anim. Sci. 66:342–353.

Erfle, J. D., R. J. Boila, R. M. Teather, S. Mahadevan, and F. D. Sauer. 1982. Effect of pH on fermentation characteristics and protein degradation by rumen microbe organisms in vitro. J. Dairy Sci. 65:1457–1464.

Fairchild, D. 1994. Pelleting cost center. Page 115 in Feed Manufacturing Technology IV. R. R. McEllhiney, ed. American Feed Industry Association, Arlington, Va.

Filho, C. C. R. 1999. Evaluation of modified condensed molasses solubles and corn steep liquor as nitrogen sources for rumen microbes in vitro and as sources of supplemental nitrogen for finishing cattle. M.S. Thesis, Iowa State University, Ames.

Goad, D. W., C. L. Goad, and C. G. Nagaraja. 1998. Ruminal microbial and fermentation changes associated with experimentally induced subacute acidosis in steers. J. Anim. Sci. 76:234–241.

Grant, R. J. 1997. Interactions among forages and nonforage fiber sources. J. Dairy Sci. 80:1438–1446.

Harmon, D. L., R. A. Britton, R. L. Prior, and R. A. Stock. 1985. Net portal absorption of lactate and volatile fatty acids in steers experiencing glucose-induced acidosis or fed a 70% concentrate diet ad libitum. J. Anim. Sci. 60:560–569.

Horn, G. W., J. L. Gordon, E. C. Prigge, and F. N. Owens. 1979. Dietary buffers and ruminal and blood parameters of subclinical lactic acidosis in steers. J. Anim. Sci. 48:683–691.

Kertz, A. F., B. K. Darcy, and L. R. Prewitt. 1981. Eating rate of cows fed four physical forms of the same grain ration. J. Dairy Sci. 64:2388–2391.

Lammers, B. P., D. R. Buckmaster, and A. J. Heinrechs. 1996. A simple method for the analysis of particle sizes of forage and total mixed rations. J. Dairy Sci. 79:922–928.

Lamond, W. J. and R. Graham. 1993. The relationship between the equilibrium moisture content of grass mixtures and the temperature and humidity of the air. J. Agric. Eng. Res. 56:327–335.

Lana, R. P., J. B. Russell, and M. E. Van Amburgh. 1998. The role of pH in regulating ruminal methane and ammonia production. J. Anim. Sci. 76:2190–2196.

Littell, R. C., G. A. Miliken, S. W. Walter, and R. D. Wolfinger. 1996. SAS systems for Mixed Models. SAS Institute, Inc., Cary, N.C.

McNaughton, J. L. and F. N. Reece. 1980. Effect of moisture content and cooking time on soybean meal urease index, trypsin inhibitor content, and broiler growth. Poultry Sci. 59:2300–2306.

Moritz, J. S., R. S. Beyer, K. J. Wilson, K. R. Cramer, L. J. McKinney, and F. J. Fairchild. 2001. Effects of moisture addition at the mixer to a corn-soybean based diet on broiler performance. J. Appl. Poult. Sci. (In press).

Mowrey, A. and J. N. Spain. 1999. Results of a nationwide survey to determine feedstuffs fed to lactating dairy cows. J. Dairy Sci. 82:445–451.

Nagaraja, T. G., M. L. Galyean, and N. A. Cole. 1998. Nutrition and disease. Vet. Clin. North Am. Food Animal Prac. 14:257–275.

Nakamura, T. and F. G. Owen. 1989. High amounts of soyhulls for pelleted concentrate diet. J. Dairy Sci. 72:988–994.

National Research Counsel. 1988. Nutrient Requirements of Dairy Cattle. 6th rev. ed. Natl. Acad. Sci., Washington, D.C.

National Research Counsel. 2001. Nutrient Requirements of Dairy Cattle. 7th rev. ed. Natl. Acad. Sci., Washington, D.C.

Owens, F. N., D. S. Secrist, W. J. Hill, and D. R. Gill. 1998. Acidosis in cattle: A review. J. Anim. Sci. 76:275–286.

Patterson, T., T. Klopfenstein, D. J. Jordon, C. Wilson, R. Mass, and R. Stock. 2001. Undegradable intake protein content of corn steep compared to soybean meal. In: Univ. Neb. Beef Cattle Rep., MP 76-A, P. 37–38.

Roe, M. B. and C. J. Sniffen. 1990. Techniques for measuring protein fractions in feedstuffs. Pages 81–88 in Proc. Cornell Nutr. Conf. Feed Manuf., Rochester, N.Y. Cornell Univ., Ithaca, N.Y.

Roland, S. J. 1938. The determination of nitrogen distribution in milk. J. Dairy Sci. 9:42–51.

SAS User's Guide: Statistics, Version 6 Third Edition. 1990. SAS Inst., Inc., Cary, N.C.

Schwab, C. G., C. K. Bozak, and N. L. Whitehouse. 1992. Amino acid limitation and flow to the duodenum at four stages of lactation. 1. Sequence of lysine and methionine limitation. J. Dairy Sci. 75:3486–3502.

Traylor, S. L., K. C. Behnke, J. D. Hancock, R. H. Hines, S. L. Johnston, B. J. Chae, and I. K. Han. 1999. Effects of expander operating conditions on nutrient digestibility in finishing pigs. Asian-Aus. J. Anim. Sci. 12:400–410.

Van Soest, P. J. and D. G. Fox. 1992. Discounts for net energy and protein. Pages 40–68 in Proc. Cornell Nutr. Conf. Feed Manuf., Rochester, N.Y. Cornell Univ., Ithaca, N.Y.

Veira, D. M. 1986. The role of ciliate protozoa in nutrition of the ruminant. J. Anim. Sci. 63:1547–1560.

Wagner, J. J., K. S. Lusby and G. W. Horn. 1983. Condensed molasses solubles, corn steep liquor and fermented ammoniated condensed whey as protein sources for beef cattle grazing dormant native range. J. Anim. Sci. 57:542–552.

Weidner, S. J. and R. J. Grant. 1994a. Soyhulls as a replacement for forage fiber in diets for lactating dairy cows. J. Dairy Sci. 77:513–521.

Wessels, R. H., E. C. Titgemeyer, C. K. Annendariz and G. S. Jean. 1966. Lasalocid effects on ruminal degradation of protein and postruminal supply of amino acids in Holstein steers. J. Dairy Sci. 79:1802–1808.

Wildman, E. E., G. M. Jones, P. E. Wagner, R. L. Bowman, H. F. Troutt, Jr., and T. N. Lesch. 1982. A dairy cow body condition scoring system and relationship to selected production characteristics. J. Dairy Sci. 65:495–501.

Winston, P. W. and D. H. Bates. 1960. Saturated solutions for the control of humidity in biological research. Ecology 41:232–237.

Wohlt, J. E., D. K. Jasaitis, and J. L. Evans. 1987. Use of acid and base titrations to evaluate the buffering capacity of ruminant feedstuffs in vitro. J. Dairy Sci. 70:1465–1470.

Wood, J. F. 1987. The functional properties of feed raw materials and their effect on the production and quality of feed pellets. Anim. Feed Sci. Technol. 18:1–17.

What is claimed is:

1. A solid feed formulation for livestock, comprising a mixture made from a substantially liquid byproduct from agricultural processing and a raw fibrous portion from milling comprising soybean hulls with a urease activity, an aqueous solution of said feed formulation having a pH less than about 6.5, said urease activity inactivated by the substantially liquid byproduct.

2. The solid feed formulation of claim 1, said solid feed formulation having an inactivated trypsin inhibitor.

3. The solid feed formation of in which said substantially liquid byproduct comprises corn steep liquor.

4. The solid feed formulation of claim 3, in which the corn steep liquor is present in an amount between about 1 and 50 weight percent.

5. The solid feed formalation of claim 3, in which the corn steep liquor is present in an amount between about 5 and 40 weight percent.

6. The solid feed formulation of claim 3, in which the corn steep liquor is present in an amount between 20 and 35 weight percent.

7. The solid feed formulation of claim 1, wherein said formulation is a pellet.

8. A solid feed for ruminants, comprising:
   raw soybean hulls; and
   corn steep liquor, said solid feed having an inactivated urease activity.

9. The solid feed of claim 8, in which the corn steep liquor is present in an amount between about 1 and 50 weight percent.

10. The solid feed of claim 8, in which the corn steep liquor is present in an amount between about 5 and 40 weight percent.

11. The solid feed of claim 8, in which the corn steep liquor is present in an amount between 20 and 35 weight percent.

12. The solid feed of claim 8, in which an aqueous solution of said solid feed has a pH less than about 6.5.

13. A process of making a solid feed for livestock, the feed comprising a substantially liquid byproduct from agicultural processing and a fibrous portion from milling comprising raw soybean hulls, the process comprising;
   combining the substantially liquid byproduct and the fibrous portion; and
   drying the combined substantially liquid byproduct and fibrous portion from milling, thereby forming said solid feed, wherein said solid feed has a deactivated urease activity.

14. The process of claim 13, in which the substantially liquid byproduct is selected from steepwater, whey, soapstocks, distillers solubles, lignin products, molasses, fermentation solubles, and any mixture thereof.

15. The process of claim 13, in which the substantially liquid byproduct comprises corn steep liquor.

16. The process of claim 13, further comprising heating the combined substantially liquid byproduct and fibrous portion.

17. The process of claim 13, in which the substantially liquid byproduct comprises corn steep liquor.

18. The process of claim 17, in which the solid feed has an inactivated trypsin inhibitor.

19. The process of claim 18, in which the corn steep liquor is present in an amount between about 1 and 50 weight percent.

20. The process of claim 18, in which the corn steep liquor is present in an amount between about 5 and 40 weight percent.

21. The process of claim 18, in which the corn steep liquor is present in an amount between about 20 and 35 weight percent.

22. The process of claim 18, in which the solid feed is a pellet, a cube, or a block.

23. The process of claim 18, in which the solid feed is a pellet.

24. A process of feeding a ruminant, comprising feeding a solid feed product to said ruminant, the solid feed product comprising raw soybean hulls and solidified corn steep liquor, said solid feed having a substantially inactivated urease activity.

25. The process of claim 24, in which the solid feed product is fed in the form of pellets.

26. The process of claim 24, in which the solid feed product contains between about 5 and 40 weight percent corn steep liquor on a dry basis.

27. The process of claim 24, further comprising feeding said ruminant another feed product containing urea.

28. The process of claim 24, in which the fed solid feed product has a pH less than about 6.5.

29. The process of claim 24, in which the fed solid feed product has an inactivated trypsin inhibitor.

30. A process of deactivating a urease enzyme in an animal feed, comprising:
   combining raw soybean hulls and corn steep liquor.

31. The process of claim 30, in which between about 1 and 50 weight percent steepwater is blended on a dry basis.

32. The process of claim 30, in which between about 5 and 40 weight percent steepwater is blended on a dry basis.

33. The process of claim 30, in which between about 20 and 35 weight percent steepwater is blended on a dry basis.

34. The process of claim 30, further comprising heating the combined soybean hulls and corn steep liquor.

35. The process of claim 30, in which an aqueous solution of the soild feed product has a pH less than about 6.5.

36. The process of claim 30, in which a trypsin inhibitor of the solid feed product is also inactivated.

* * * * *